United States Patent
Donderici et al.

(10) Patent No.: US 11,795,817 B2
(45) Date of Patent: Oct. 24, 2023

(54) SYSTEM AND METHOD FOR DETERMINING FORMATION CHARACTERISTICS USING ELECTRICAL ARC MODELING

(71) Applicant: Halliburton Energy Services, Inc., Houston, TX (US)

(72) Inventors: Burkay Donderici, Pittsford, NY (US); Reza Khalaj Amineh, Leonia, NJ (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 399 days.

(21) Appl. No.: 17/057,533

(22) PCT Filed: Jun. 20, 2018

(86) PCT No.: PCT/US2018/038432
§ 371 (c)(1),
(2) Date: Nov. 20, 2020

(87) PCT Pub. No.: WO2019/245545
PCT Pub. Date: Dec. 26, 2019

(65) Prior Publication Data
US 2021/0199005 A1     Jul. 1, 2021

(51) Int. Cl.
*E21B 49/00*     (2006.01)
*E21B 47/002*   (2012.01)
(Continued)

(52) U.S. Cl.
CPC .............. *E21B 49/00* (2013.01); *E21B 7/15* (2013.01); *E21B 47/0025* (2020.05);
(Continued)

(58) Field of Classification Search
CPC .......... E21B 7/15; E21B 7/24; E21B 47/0025; E21B 43/003; G01V 3/083; G01V 3/38;
(Continued)

(56) References Cited

U.S. PATENT DOCUMENTS

| 4,741,405 A | 5/1988 | Moeny et al. |
| 9,181,754 B2 | 11/2015 | Donderici et al. |

(Continued)

FOREIGN PATENT DOCUMENTS

| WO | 2008/003092 | 1/2008 |
| WO | 2010/027866 | 3/2010 |

OTHER PUBLICATIONS

International Search Report and Written Opinion received for PCT Patent Application No. PCT/US2018/038432, dated Mar. 19, 2019; 12 pages.

(Continued)

*Primary Examiner* — Toan M Le
(74) *Attorney, Agent, or Firm* — Kilpatrictk Townsend & Stockton LLP

(57) ABSTRACT

A disclosed downhole drilling system may include a drill bit electrically coupled to a pulse-generating circuit to generate electrical arcs between first and second electrodes during pulsed drilling operations, a sensor to record responses to electromagnetic or acoustic waves produced by the electrical arcs, and a sensor analysis system. The electrical arcs occur at different azimuthal locations between the electrodes. The sensor analysis system may obtain a plurality of measurements representing first responses recorded by the sensor during a pulsed drilling operation, generate a model of a source of the electrical arcs based on the measurements, obtain an additional measurement representing a second response recorded by the sensor during the operation, and determine a characteristic of a formation near the drill bit (Continued)

using an inversion based on the model and the additional measurement. The determined characteristic may be used to determine dip parameters or construct images of the formation.

55 Claims, 13 Drawing Sheets

(51) Int. Cl.
 *E21B 7/15* (2006.01)
 *G01V 3/08* (2006.01)
 *G01V 3/38* (2006.01)
 *G01V 11/00* (2006.01)

(52) U.S. Cl.
 CPC .............. *G01V 3/083* (2013.01); *G01V 3/38* (2013.01); *G01V 11/007* (2013.01); *E21B 2200/20* (2020.05); *G01V 2210/6163* (2013.01)

(58) Field of Classification Search
 CPC ............... G01V 3/30; G01V 11/007; G01V 2210/6163; G01V 2210/1429; G01V 1/44
 See application file for complete search history.

(56) References Cited

U.S. PATENT DOCUMENTS

| 2009/0050371 A1 | 2/2009 | Moeny |
| 2010/0212962 A1 | 8/2010 | Rosten et al. |
| 2011/0163891 A1 | 7/2011 | Wilson et al. |
| 2011/0308859 A1 | 12/2011 | Bittar et al. |
| 2012/0103693 A1 | 5/2012 | Jeffryes |
| 2013/0032404 A1* | 2/2013 | Donderici ............... E21B 7/15 |
| | | 175/45 |
| 2015/0219783 A1 | 8/2015 | Sitka |
| 2016/0003029 A1 | 1/2016 | Hay |
| 2016/0024849 A1 | 1/2016 | Kocis et al. |

OTHER PUBLICATIONS

Safinya, K.A. et al., "Improved formation imagine with extended microelectrical arrays," *SPE Annual Technical Conference and Exhibition*, Oct. 1991, 12 pages.

San Martin, L. et al., "Oil-based mud imaging tool generates high quality borehole images in challenging formation and borehole condition, including thin beds, lower resistive formations and shales," *SPWLA 49th Annual Logging Symposium*, May 2008, 15 pages.

Cheung, R. et al., "Field test results of a new oil-base mud formation imager tool," *SPWLA 42nd Annual Logging Symposium*, Jun. 2001, 14 pages.

Dumont, A. et al., "The oil-based mud dipmeter tool," *SPWLA 28th Annual Logging Symposium*, Jul. 1987, 15 pages.

Prammer, M.G. et al., "Field testing of an advanced LWD imaging/resistivity tool," *SPWLA 48th Annual Logging Symposium*, Jun. 2007, 15 pages.

Office Action, ARP190101335, dated Jan. 11, 2023, 7 pages.

* cited by examiner

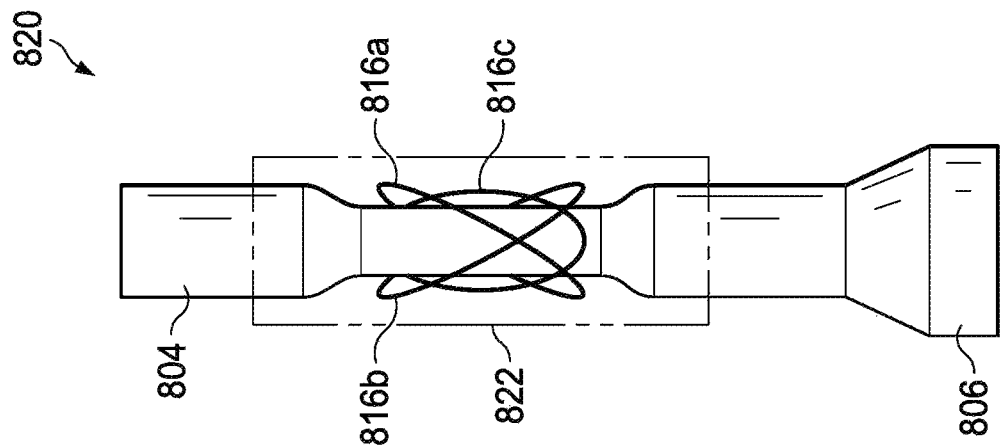
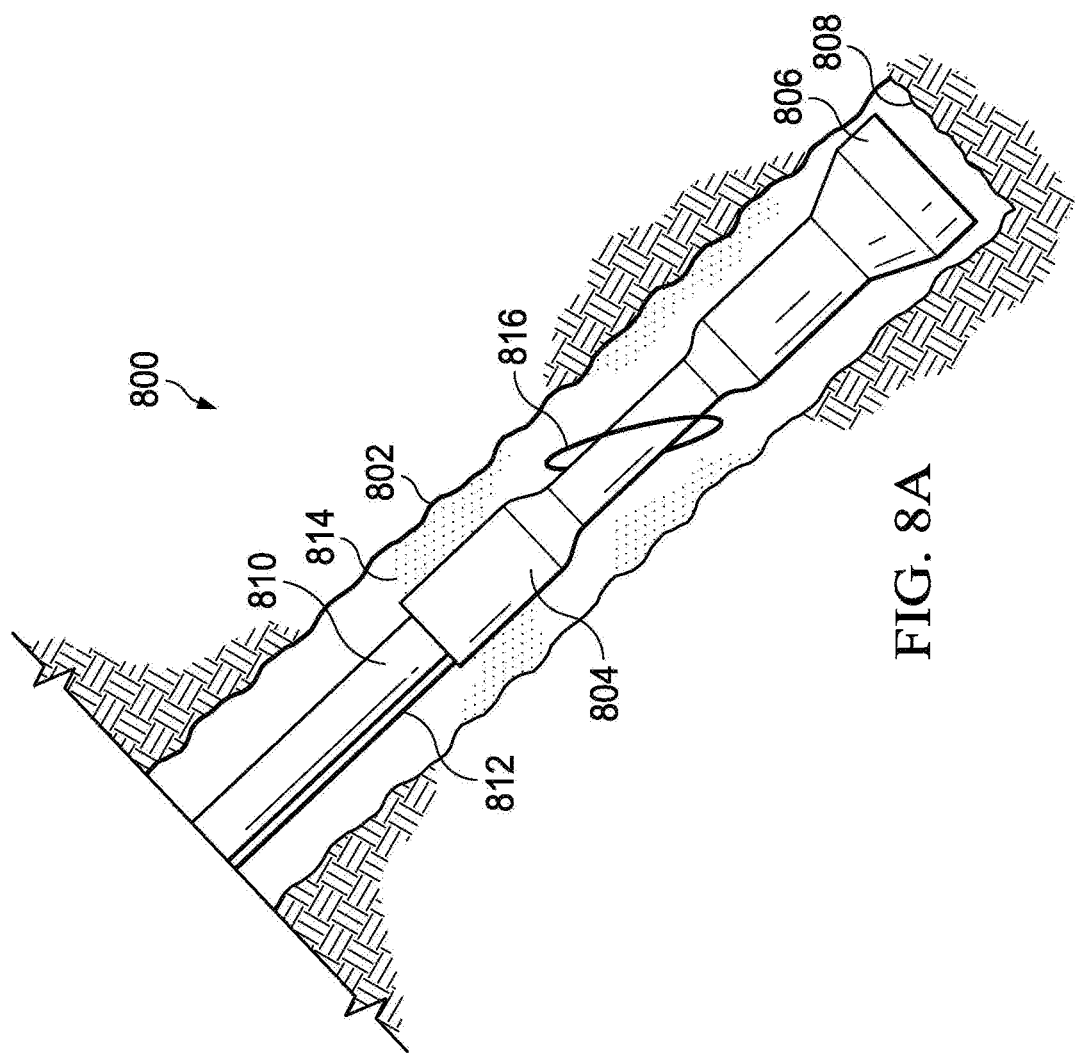

SYSTEM AND METHOD FOR DETERMINING FORMATION CHARACTERISTICS USING ELECTRICAL ARC MODELING

RELATED APPLICATIONS

This application is a U.S. National Stage Application of International Application No. PCT/US2018/038432 filed Jun. 20, 2018, which designates the United States.

TECHNICAL FIELD

The present disclosure relates generally to pulsed drilling operations and, more particularly, to systems and methods for determining formation characteristics using electrical arc modeling.

BACKGROUND

Electrocrushing drilling uses pulsed power technology to drill a wellbore in a rock formation. Pulsed power technology repeatedly applies a high electric potential across the electrodes of a pulsed-power drill bit, which ultimately causes the surrounding rock to fracture. The fractured rock is carried away from the bit by drilling fluid and the bit advances downhole. Electrocrushing drilling operations may also be referred to as pulsed drilling operations.

BRIEF DESCRIPTION OF THE DRAWINGS

For a more complete understanding of the present disclosure and its features and advantages, reference is now made to the following description, taken in conjunction with the accompanying drawings, in which:

FIG. 8A is an elevation view of exemplary components of a drilling system including a sensor associated with a bottom-hole assembly (BHA) of the drilling system;

FIG. 8B is an elevation view of exemplary components of a drilling system including multiple sensors associated with a bottom-hole assembly (BHA) of the drilling system;

DETAILED DESCRIPTION

Electrocrushing drilling may be used to form wellbores in subterranean rock formations for recovering hydrocarbons, such as oil and gas, from these formations. Electrocrushing drilling uses pulsed-power technology to fracture the rock formation by repeatedly delivering electrical arcs or high-energy shock waves to the rock formation. More specifically, a drill bit of a pulsed-power drilling system is excited by a train of high-energy electrical pulses that produce high power discharges through the formation at the downhole end of the drill bit. The high-energy electrical pulses provide information about the properties of the formation and/or drilling fluid. The discharges produced by the high-energy electrical pulses, in turn, fracture part of the formation proximate to the drill bit and produce electromagnetic and acoustic waves inside the layers of the formation that carry further information about properties of the formation. The azimuthal angles over which discharges take place between electrodes at the tip of the drill bit may occur randomly along those azimuthal angles for which the formation is still intact.

As described in detail herein, a pulsed-power drilling system with an associated sensor analysis system may implement logging-while-drilling techniques that include statistical modeling of the source of the electrical arcs (sparks) generated during the drilling process, an analysis of the excitation directions of the electrical arcs for azimuthal sensitivity that produces a representation referred to as an azimuthal binning, and/or a normalization of the data recorded by various electromagnetic or acoustic sensors. The normalization may be performed by taking ratios or averages of the responses recorded by the sensors. Measurements of the strength of the electrical arcs along various azimuthal angles may be input to an inversion process to determine characteristics of a formation in proximity to the drill bit. Other inputs to an inversion process may include a deterministic model of the source of the electrical arcs or data representing an azimuthal binning of the electrical arcs. Measurements representing responses recorded by the sensors and/or results of an inversion process whose inputs include such measurements may be used to construct images of the formation or to determine dip parameters at a boundary between two formation layers.

There are numerous ways in which formation characteristics, formation images, and/or dip parameters may be determined in a pulsed-power drilling system with an associated sensor analysis system. Thus, embodiments of the present disclosure and its advantages are best understood by referring to FIGS. 1 through 13, where like numbers are used to indicate like and corresponding parts.

Figure 1:
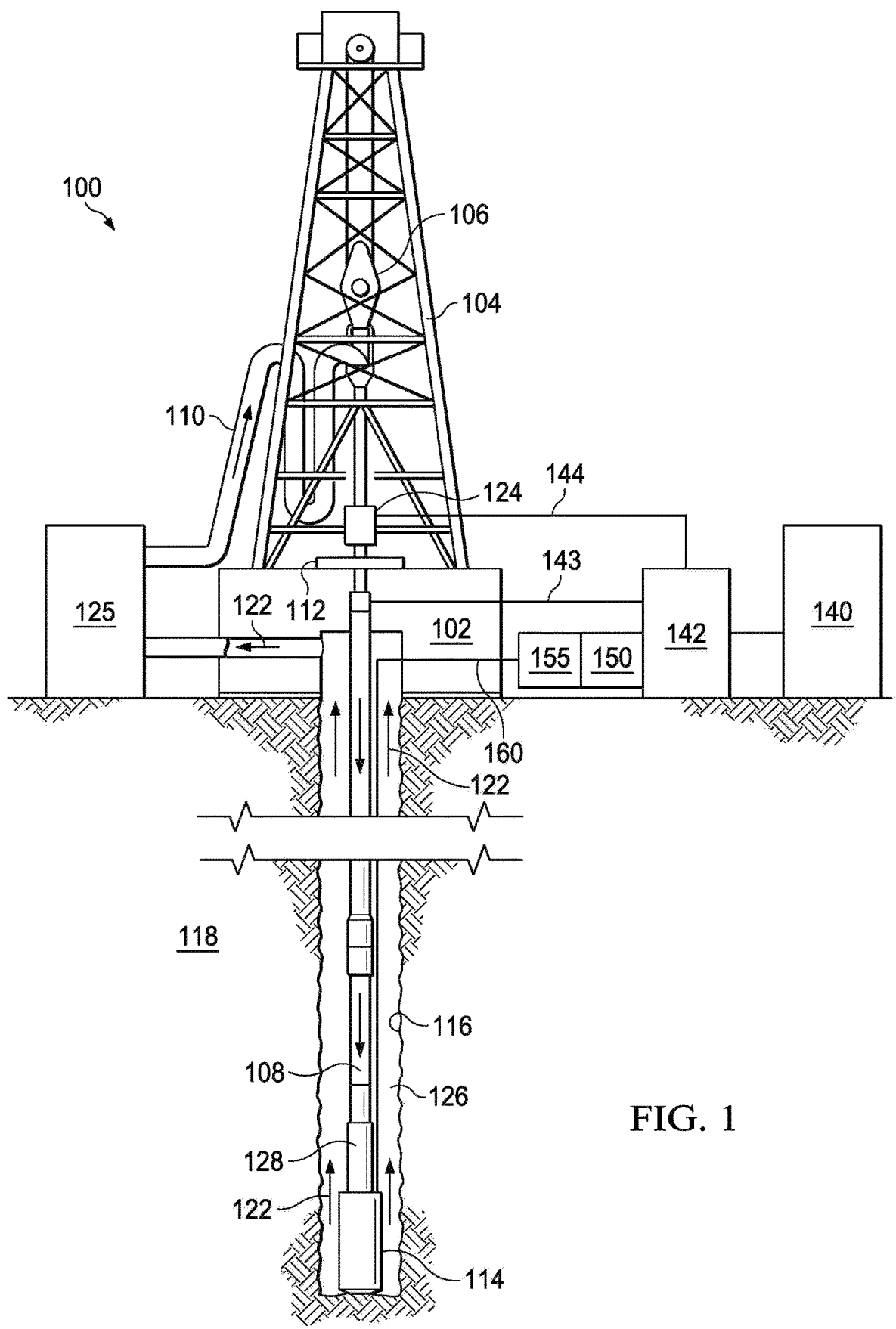
FIG. 1 is an elevation view of an exemplary pulsed-power drilling system used in a wellbore environment.

FIG. 1 is an elevation view of an exemplary pulsed-power drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 may also include pump 125, which circulates drilling fluid 122 through a feed pipe to kelly 110, which in turn conveys drilling fluid 122 downhole through interior channels of drill string 108 and through one or more fluid flow ports in pulsed-power drill bit 114. Drilling fluid 122 circulates back to the surface via annulus 126 formed between drill string 108 and the sidewalls of wellbore 116. Fractured portions of the formation are carried to the surface by drilling fluid 122 to remove those fractured portions from wellbore 116.

Pulsed-power drill bit 114 is attached to the distal end of drill string 108 and may be an electrocrushing drill bit or an electrohydraulic drill bit. Power may be supplied to drill bit 114 from components downhole, components at the surface and/or a combination of components downhole and at the surface. For example, generator 140 may generate electrical power and provide that power to power-conditioning unit 142. Power-conditioning unit 142 may then transmit electrical energy downhole via surface cable 143 and a subsurface cable (not expressly shown in FIG. 1) contained within drill string 108 or attached to the side of drill string 108. A pulse-generating circuit within BHA 128 may receive the electrical energy from power-conditioning unit 142, and may generate high-energy electrical pulses to drive drill bit 114. The pulse-generating circuit may include a power source input, including two input terminals, and a first capacitor coupled between the input terminals. The pulse-generating circuit may also include a switch, a transformer, and a second capacitor whose terminals are coupled to respective electrodes of drill bit 114. The switch may include a mechanical switch, a solid-state switch, a magnetic switch, a gas switch, or any other type of switch suitable to open and close the electrical path between the power source input and a first winding of the transformer. The transformer generates a current through a second winding when the switch is closed and current flows through first winding. The current through the second winding charges the second capacitor. As the voltage across the second capacitor increases, the voltage across the electrodes of the drill bit increases.

The pulse-generating circuit within BHA 128 may be utilized to repeatedly apply a large electric potential, for example up to or exceeding 150 kV, across the electrodes of drill bit 114. Each application of electric potential is referred to as a pulse. When the electric potential across the electrodes of drill bit 114 is increased enough during a pulse to generate a sufficiently high electric field, an electrical arc forms through rock formation 118 at the bottom of wellbore 116. The arc temporarily forms an electrical coupling between the electrodes of drill bit 114, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure is sufficiently high to break the rock itself into small bits or cuttings. This fractured rock is removed, typically by drilling fluid 122, which moves the fractured rock away from the electrodes and uphole. The terms "uphole" and "downhole" may be used to describe the location of various components of drilling system 100 relative to drill bit 114 or relative to the bottom of wellbore 116 shown in FIG. 1, rather than to describe relative directions in terms of true up or true down. Therefore, if wellbore 116 is a horizontal wellbore or is otherwise angled away from vertical, the term "uphole" may refer to the direction away from drill bit 114, regardless of whether that direction is to the right, to the left, up, or down relative to drill bit 114. For example, a first component described as uphole from a second component may be further away from drill bit 114 and/or the bottom of wellbore 116 than the second component. Similarly, a first component described as being downhole from a second component may be located closer to drill bit 114 and/or the bottom of wellbore 116 than the second component. The electrical arc may also generate acoustic and/or electromagnetic waves that are transmitted within rock formation 118 and/or drilling fluid 122. Sensors placed within wellbore 116 and/or on the surface may record responses to high-energy electrical pulses, electrical arcs, acoustic waves and/or electromagnetic waves. Sensor analysis system 150 may receive measurements representing the recorded responses and may analyze the measurements to determine characteristics of rock formation 118 or for other purposes.

Wellbore 116, which penetrates various subterranean rock formations 118, is created as drill bit 114 repeatedly fractures the rock formation and drilling fluid 122 moves the fractured rock uphole. Wellbore 116 may be any hole formed into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

Although pulsed-power drill bit 114 is described above as implementing electrocrushing drilling, pulsed-power drill bit 114 may also be used for electrohydraulic drilling. In electrohydraulic drilling, rather than generating an electrical arc within the rock, drill bit 114 applies a large electrical potential across the one or more electrodes and a ground ring to form an arc across the drilling fluid proximate to the downhole end of wellbore 116. The high temperature of the arc vaporizes the portion of the drilling fluid immediately surrounding the arc, which in turn generates a high-energy shock wave in the remaining fluid. The one or more electrodes of electrohydraulic drill bit may be oriented such that the shock wave generated by the arc is transmitted toward the bottom of wellbore 116. When the shock wave contacts and bounces off of the rock at the bottom of wellbore 116, the rock fractures. Accordingly, wellbore 116 may be formed in subterranean formation 118 using drill bit 114 that implements either electrocrushing or electrohydraulic drilling.

Figure 7:
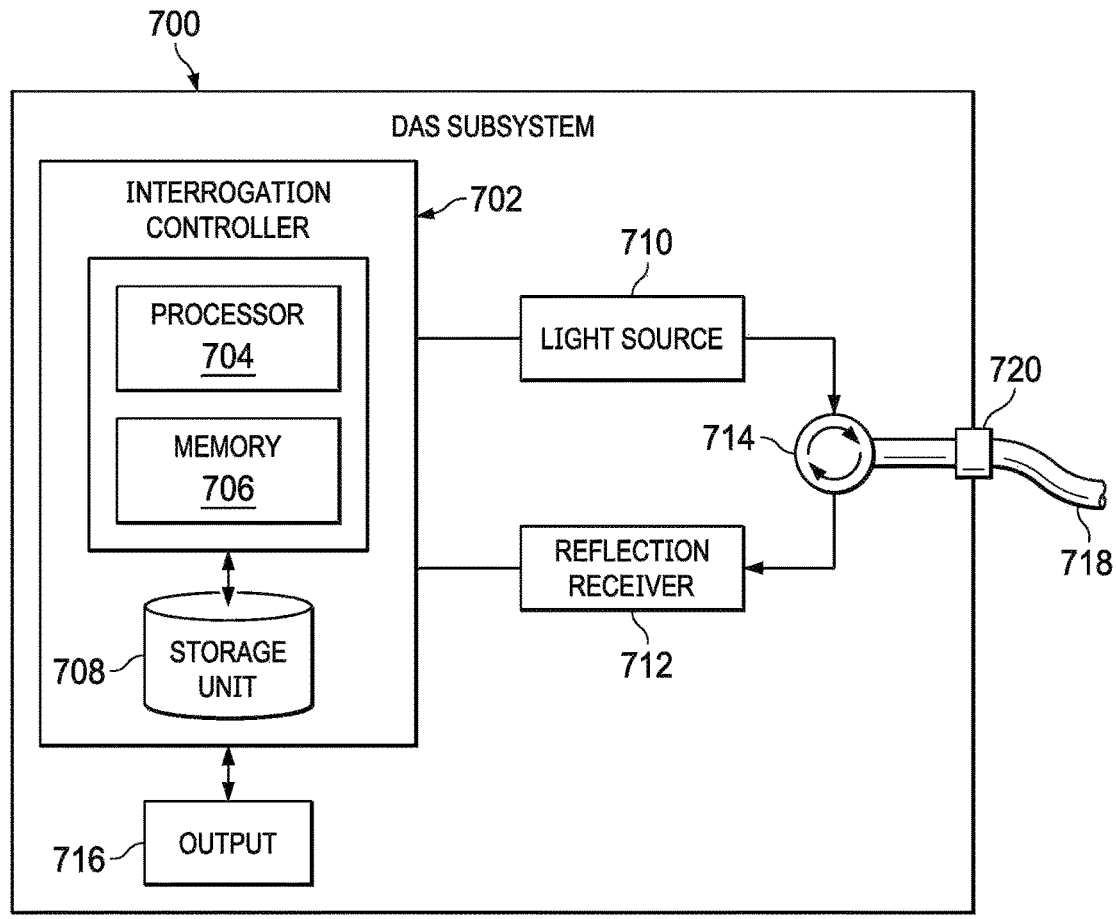
FIG. 7 is a block diagram illustrating an exemplary distributed acoustic sensing subsystem.

Distributed acoustic sensing (DAS) subsystem 155 may be positioned at the surface for use with pulsed-power drilling system 100, or at any other suitable location. DAS subsystem 155 may be coupled to optical fiber 160, which is positioned within a portion of the pulsed-power drilling system 100. For example, optical fiber 160 may be positioned within wellbore 116. Any suitable number of DAS subsystems (each coupled to an optical fiber 160 located downhole) may be placed inside or adjacent to wellbore 116. With optical fiber 160 positioned inside a portion of wellbore 116, DAS subsystem 155 may determine characteristics associated with formation 118 based on changes in strain caused by acoustic waves. DAS subsystem 155 may be configured to transmit optical pulses into optical fiber 160, and to receive and analyze reflections of the optical pulse to detect changes in strain caused by acoustic waves. An example DAS subsystem is illustrated in FIG. 7 and described in more detail below.

Figure 13:
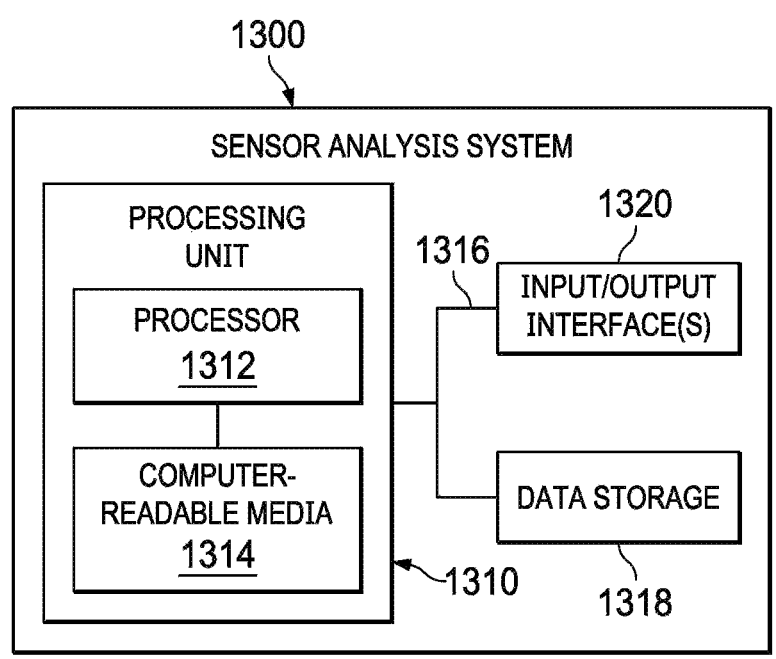
FIG. 13 is a block diagram illustrating an exemplary sensor analysis system associated with a pulsed-power drilling system.

Sensor analysis system 150 may be positioned at the surface for use with pulsed-power drilling system 100 as illustrated in FIG. 1, or at any other suitable location. Any suitable telemetry system may be used for communicating signals from various acoustic, electrical or electromagnetic sensors at the surface or downhole to sensor analysis system 150 during a pulsed drilling operation. For example, sensor analysis system 150 may be coupled to optical fiber 160 that extends downhole in wellbore 116. More specifically, one or more input/output interfaces of sensor analysis system 150 may be coupled to optical fiber 160 for communication to and from acoustic, electrical or electromagnetic sensors positioned downhole. For example, the sensors may transmit measurements to sensor analysis system 150. Any suitable number of sensor analysis systems 150 (each of which may be coupled to an optical fiber located downhole) may be placed inside or adjacent to wellbore 116. An example sensor analysis system is illustrated in FIG. 13 and described in more detail below.

Optical fiber 160 may be enclosed within a cable, rope, line, or wire. More specifically, optical fiber 160 may be enclosed within a slickline, a wireline, coiled tubing, or another suitable conveyance for suspending a downhole tool in wellbore 116. Optical fiber 160 may be charged by a laser to provide power to DAS subsystem 155, sensor analysis system 150, or sensors located within wellbore 116.

Figure 2A:
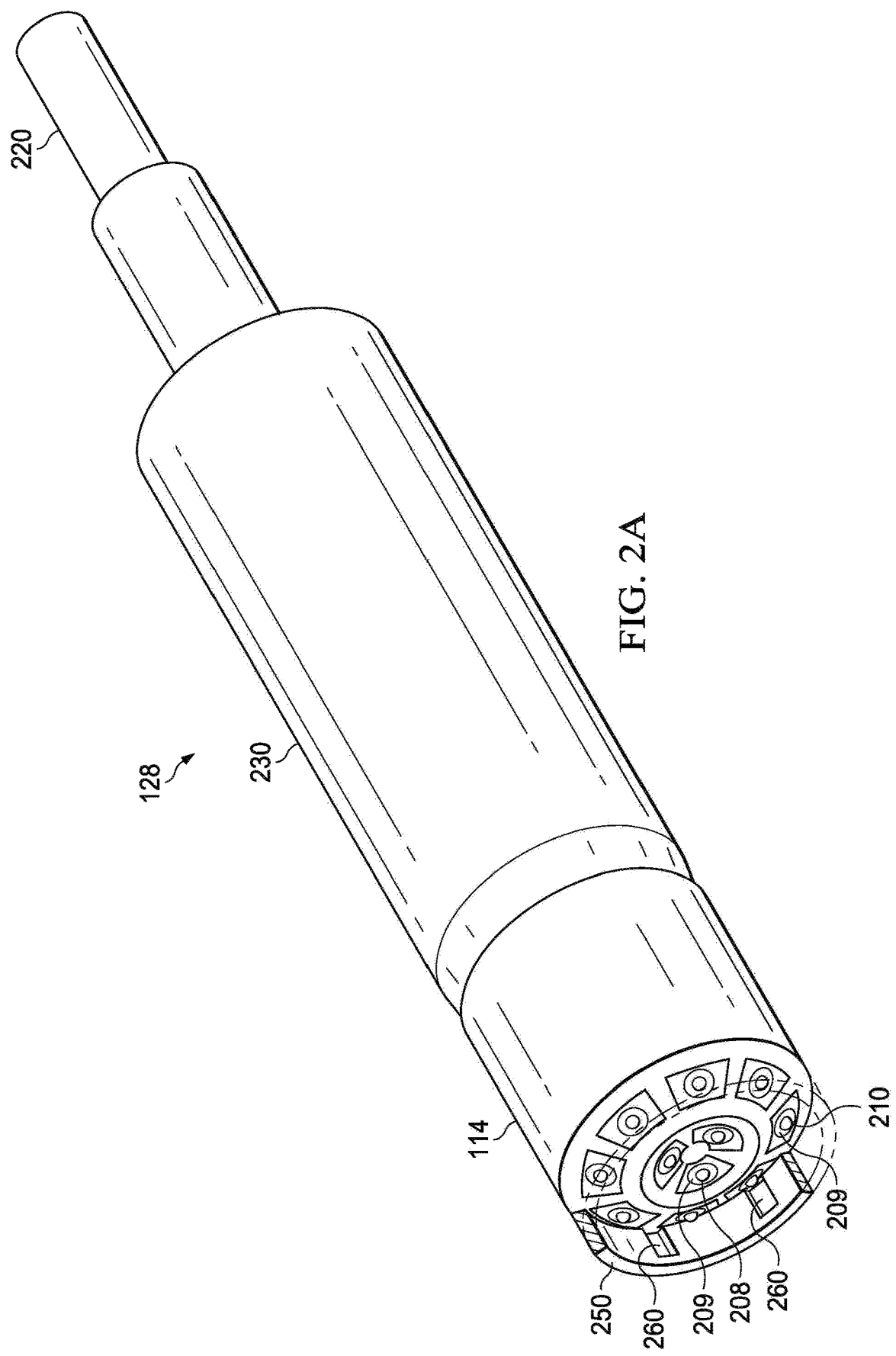
FIG. 2A is a perspective view of exemplary components of a bottom-hole assembly for a pulsed-power drilling system.

FIG. 2A is a perspective view of exemplary components of a bottom-hole assembly for a pulsed-power drilling system. BHA 128 may include pulsed-power tool 230 and drill bit 114. For the purposes of the present disclosure, drill bit 114 may be integrated within BHA 128, or may be a separate component coupled to BHA 128.

Pulsed-power tool 230 may provide pulsed electrical energy to drill bit 114. Pulsed-power tool 230 receives electrical power from a power source via cable 220. For example, pulsed-power tool 230 may receive electrical power via cable 220 from a power source located on the surface as described above with reference to FIG. 1, or from a power source located downhole such as a generator powered by a mud turbine. Pulsed-power tool 230 may also receive electrical power via a combination of a power source located on the surface and a power source located downhole. Drill bit 114 may include ground ring 250, shown in part in FIG. 2A. Ground ring 250 may function as an electrode. Pulsed-power tool 230 converts electrical power received from the power source into high-energy electrical pulses that are applied across electrodes 208 and ground ring 250 of drill bit 114. Pulsed-power tool 230 may also apply high-energy electrical pulses across electrode 210 and ground ring 250 in a similar manner as described for electrode 208 and ground ring 250. Pulsed-power tool 230 may include a pulse-generating circuit as described above in reference to FIG. 1.

Although illustrated as a contiguous ring in FIG. 2A, ground ring 250 may be non-contiguous discrete electrodes and/or implemented in different shapes. Each of electrodes 208 and 210 may be positioned at a minimum distance from ground ring 250 of approximately 0.4 inches and at a maximum distance from ground ring 250 of approximately 4 inches. The distance between electrodes 208 or 210 and ground ring 250 may be based on the parameters of the pulsed drilling operation and/or on the diameter of drill bit 114. For example, the distance between electrodes 208 or 210 and ground ring 250, at their closest spacing, may be at least 0.4 inches, at least 1 inch, at least 1.5 inches, or at least 2 inches.

Referring to FIG. 1 and FIG. 2A, drilling fluid 122 is typically circulated through drilling system 100 at a flow rate sufficient to remove fractured rock from the vicinity of drill bit 114. In addition, drilling fluid 122 may be under sufficient pressure at a location in wellbore 116, particularly a location near a hydrocarbon, gas, water, or other deposit, to prevent a blowout. Drilling fluid 122 may exit drill string 108 via openings 209 surrounding each of electrodes 208 and 210. The flow of drilling fluid 122 out of openings 209 allows electrodes 208 and 210 to be insulated by the drilling fluid. A solid insulator (not expressly shown) may surround electrodes 208 and 210 on drill bit 114. Drill bit 114 may also include one or more fluid flow ports 260 on the face of drill bit 114 through which drilling fluid 122 exits drill string 108, for example fluid flow ports 260 on ground ring 250. Fluid flow ports 260 may be simple holes, or they may be nozzles or other shaped features. Because fines are not typically generated during pulsed-power drilling, as opposed to mechanical drilling, drilling fluid 122 may not need to exit the drill bit at as high a pressure as the drilling fluid in mechanical drilling. As a result, nozzles and other features used to increase drilling fluid pressure may not be needed on drill bit 114. However, nozzles or other features to increase drilling fluid 122 pressure or to direct drilling fluid may be included for some uses. Additionally, the shape of a solid insulator, if present, may be selected to enhance the flow of drilling fluid 122 around the components of drill bit 114.

If drilling system 100 experiences vaporization bubbles in drilling fluid 122 near drill bit 114, the vaporization bubbles may have deleterious effects. For instance, vaporization bubbles near electrodes 208 or 210 may impede formation of the arc in the rock. Drilling fluid 122 may be circulated at a flow rate also sufficient to remove vaporization bubbles from the vicinity of drill bit 114. Fluid flow ports 260 may permit the flow of drilling fluid 122 along with any fractured rock or vaporization bubbles away from electrodes 208 and 210 and uphole.

Figure 2B:
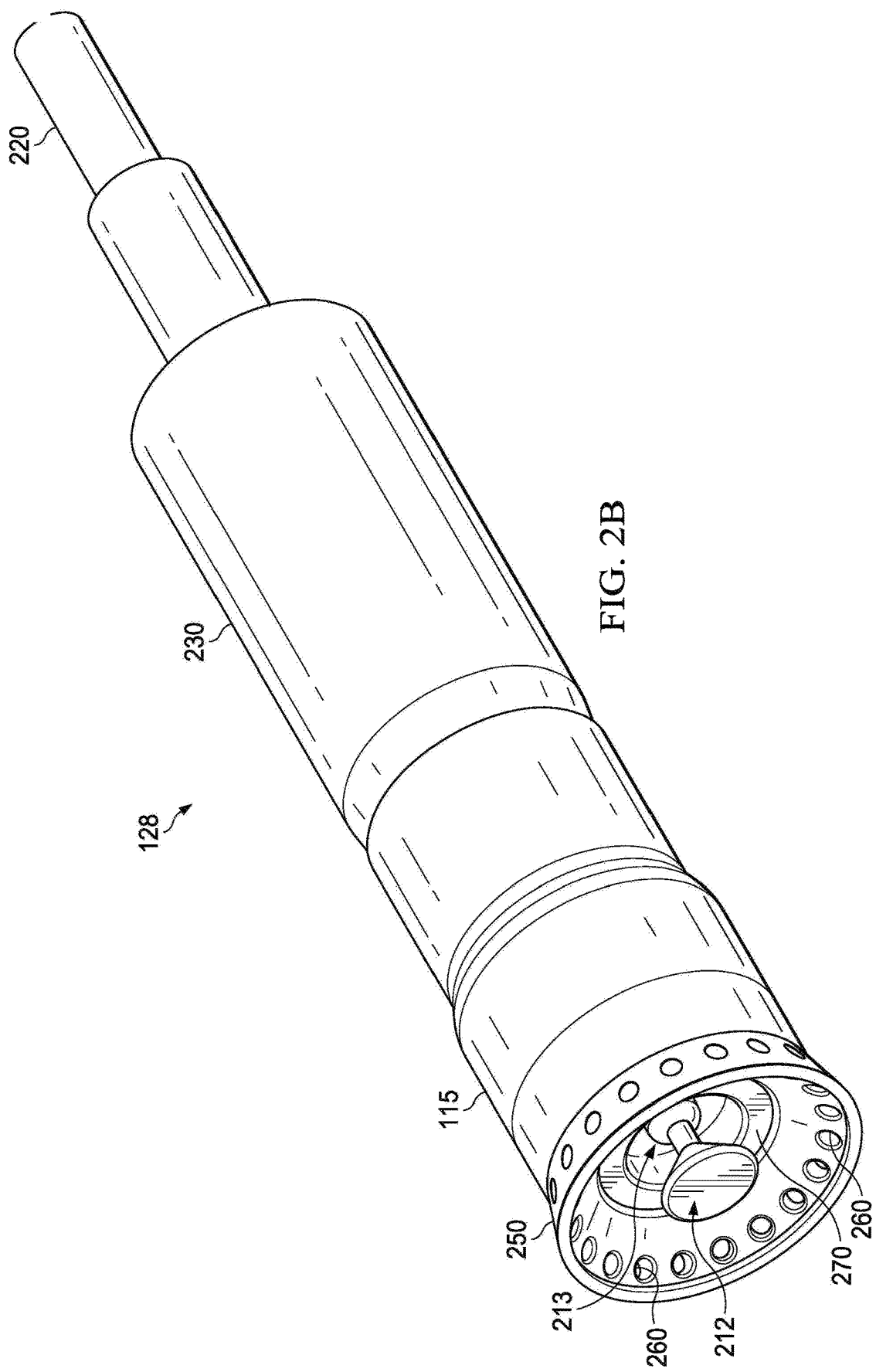
FIG. 2B is a perspective view of exemplary components of a bottom-hole assembly for a pulsed-power drilling system.

FIG. 2B is a perspective view of exemplary components of another bottom-hole assembly for a pulsed-power drilling system. BHA 128 may include pulsed-power tool 230 and drill bit 115. For the purposes of the present disclosure, drill bit 115 may be integrated within BHA 128, or may be a separate component that is coupled to BHA 128. BHA 128 and pulsed-power tool 230 may include features and functionalities similar to those discussed above in FIG. 2A.

Drill bit 115 may include bit body 255, electrode 212, ground ring 250, and solid insulator 270. Electrode 212 may be placed approximately in the center of drill bit 115. Electrode 212 may be positioned at a minimum distance from ground ring 250 of approximately 0.4 inches and at a maximum distance from ground ring 250 of approximately 4 inches. The distance between electrode 212 and ground ring 250 may be based on the parameters of the pulsed drilling operation and/or on the diameter of drill bit 115. For example, the distance between electrode 212 and ground ring 250, at their closest spacing, may be at least 0.4 inches, at least 1 inch, at least 1.5 inches, or at least 2 inches. The distance between electrode 212 and ground ring 250 may be generally symmetrical or may be asymmetrical such that the electric field surrounding the drill bit has a symmetrical or asymmetrical shape. The distance between electrode 212 and ground ring 250 allows drilling fluid 122 to flow between electrode 212 and ground ring 250 to remove vaporization bubbles from the drilling area. Electrode 212 may have any suitable diameter based on the pulsed drilling operation, on the distance between electrode 212 and ground ring 250, and/or on the diameter of drill bit 115. For example, electrode 212 may have a diameter between approximately 2 and approximately 10 inches (i.e., between approximately 51 and approximately 254 millimeters). Ground ring 250 may function as an electrode and provide a location on the drill bit where an electrical arc may initiate and/or terminate.

Drill bit 115 may include one or more fluid flow ports on the face of the drill bit through which drilling fluid exits the drill string 108. For example, ground ring 250 of drill bit 115 may include one or more fluid flow ports 260 such that drilling fluid 122 flows through fluid flow ports 260 carrying fractured rock and vaporization bubbles away from the drilling area. Fluid flow ports 260 may be simple holes, or they may be nozzles or other shaped features. Drilling fluid 122 is typically circulated through drilling system 100 at a flow rate sufficient to remove fractured rock from the vicinity of drill bit 115. In addition, drilling fluid 122 may be under sufficient pressure at a location in wellbore 116, particularly a location near a hydrocarbon, gas, water, or other deposit, to prevent a blowout. Drilling fluid 122 may exit drill string 108 via opening 213 surrounding electrode 212. The flow of drilling fluid 122 out of opening 213 allows electrode 212 to be insulated by the drilling fluid. Because fines are not typically generated during pulsed-power drilling, as opposed to mechanical drilling, drilling fluid 122 may not need to exit the drill bit at as high a pressure as the drilling fluid in mechanical drilling. As a result, nozzles and other features used to increase drilling fluid pressure may not be needed on drill bit 115. However, nozzles or other features to increase drilling fluid 122 pressure or to direct drilling fluid may be included for some uses. Additionally, the shape of solid insulator 270 may be selected to enhance the flow of drilling fluid 122 around the components of drill bit 115.

As described above with reference to FIGS. 1, 2A, and 2B, when the electric potential across electrodes of a pulsed-power drill bit becomes sufficiently large, an electrical arc forms through the rock formation and/or drilling fluid that is near the electrodes. The arc provides a temporary electrical short between the electrodes, and thus allows electric current to flow through the arc inside a portion of the rock formation and/or drilling fluid at the bottom of the wellbore. The arc increases the temperature of the portion of the rock formation through which the arc flows and the surrounding formation and materials. The temperature is sufficiently high to vaporize any water or other fluids that might be proximate to the arc and may also vaporize part of the rock itself. The vaporization process creates a high-pressure gas which expands and, in turn, fractures the surrounding rock.

Pulsed-power drilling systems and pulsed-power tools may utilize any suitable pulse-generating circuit topology to generate and apply high-energy electrical pulses across electrodes within the pulsed-power drill bit. Such pulse-generating circuit topologies may utilize electrical resonance to generate the high-energy electrical pulses required for pulsed-power drilling. The pulse-generating circuit may be shaped and sized to fit within the circular cross-section of pulsed-power tool 230, which as described above with reference to FIGS. 2A and 2B, may form part of BHA 128. The pulse-generating circuit may be enclosed within an encapsulant, such a thermally conductive material that protects the pulse-generating circuit from the wide range of temperatures (for example, from approximately 10 to approximately 200 degrees Centigrade) within the wellbore.

The pulsed-power drilling systems described herein may generate multiple electrical arcs per second using a specified excitation current profile that causes a transient electrical arc to form and arc through the most conducting portion of the wellbore floor. As described above, the arc causes that portion of the wellbore floor to disintegrate or fragment and be swept away by the flow of drilling fluid. As the most conductive portions of the wellbore floor are removed, subsequent electrical arcs may naturally seek the next most conductive portion. Therefore, obtaining measurements from which estimates of the excitation direction can be generated may provide information usable in determining characteristics of the formation.

Figure 3:
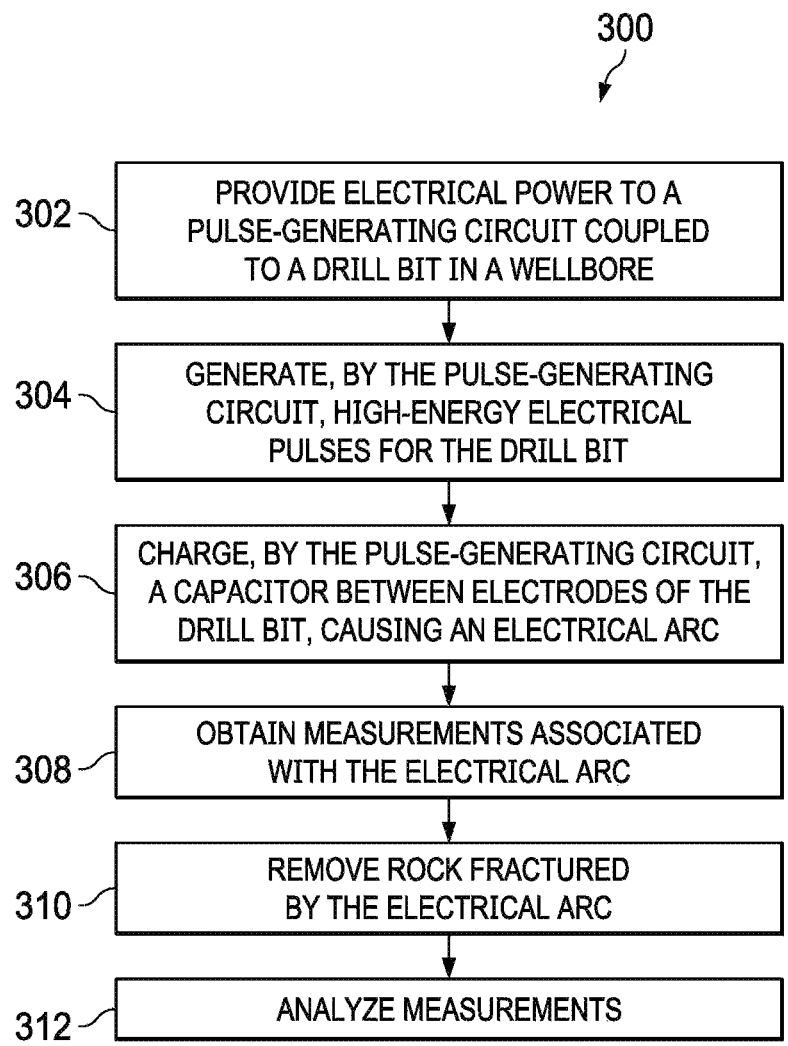
FIG. 3 is a flow chart illustrating an exemplary method for performing a pulsed drilling operation.

FIG. 3 is a flow chart illustrating an exemplary method 300 for performing a pulsed drilling operation using an electrocrushing drill bit or an electrohydraulic drill bit placed downhole in a wellbore. For example, drill bit 114 illustrated in FIG. 2A or drill bit 115 illustrated in FIG. 2B may be placed downhole in wellbore 116 as shown in FIG. 1. Method 300 includes, at 302, providing electrical power to a pulse-generating circuit coupled to the drill bit. For example, the pulse-generating circuit may be coupled to a first electrode and a second electrode of the drill bit. The first electrode may be electrode 208, 210, or 212 and the second electrode may be ground ring 250 discussed above with respect to FIGS. 2A and 2B. The pulse-generating circuit may be implemented within pulsed-power tool 230 shown in FIGS. 2A and 2B, and may receive electrical power from a power source on the surface, from a power source located downhole, or from a combination of a power source on the surface and a power source located downhole. Electrical power may be supplied downhole to a pulse-generating circuit by way of a cable, such as cable 220 described above with respect to FIGS. 2A and 2B. The power may be provided to the pulse-generating circuit within pulse-power tool 230 at a power source input.

At 304, high-energy electrical pulses are generated by the pulse-generating circuit for the drill bit by converting the electrical power received from the power source into high-energy electrical pulses. For example, the pulse-generating circuit may use electrical resonance to convert a low-voltage power source (for example, approximately 1 kV to approximately 5 kV) into high-energy electrical pulses capable of applying at least 150 kV across electrodes of the drill bit.

At 306, the pulse-generating circuit charges a capacitor between electrodes of the drill bit, causing an electrical arc. For example, a switch located downhole within the pulse-generating circuit may close to charge a capacitor that is electrically coupled between the first electrode and the second electrode. The switch may close to generate a high-energy electrical pulse and may be open between pulses. The switch may be a mechanical switch, a solid-state switch, a magnetic switch, a gas switch, or any other type of switch. Accordingly, as the voltage across the capacitor increases, the voltage across the first electrode and the second electrode increases. As described above with reference to FIGS. 1, 2A and 2B, when the voltage across the electrodes becomes sufficiently large, an electrical arc may form through the drilling fluid and/or a rock formation that is proximate to the electrodes. The arc may provide a temporary electrical short between the electrodes, and thus may discharge, at a high current level, the voltage built up across the capacitor.

At 308, measurements associated with the electrical arc are obtained. For example, one or more acoustic, electrical and/or electromagnetic sensors may record responses to received signals including, but not limited to, high-energy electrical pulses, electrical arcs, or acoustic and/or electromagnetic waves produced by the electrical arc during a pulsed drilling operation, and may provide measurements representing the recorded responses to a sensor analysis system, such as sensor analysis system 150 illustrated in FIG. 1 or sensor analysis system 1300 illustrated in FIG. 13.

As described above with reference to FIGS. 1, 2A and 2B, the electrical arc greatly increases the temperature of the portion of the rock formation through which the arc flows as well as the surrounding formation and materials, such that the rock formation at the bottom of the wellbore may be fractured with the electrical arc. The temperature may be sufficiently high to vaporize any water or other fluids that may be touching or near the arc and may also vaporize part of the rock itself. The vaporization process creates a high-pressure gas which expands and, in turn, fractures the surrounding rock. At 310, rock fractured by the electrical arc may be removed from the downhole end of the wellbore. For example, as described above with reference to FIG. 1, drilling fluid 122 may move the fractured rock away from the electrodes and uphole from the drill bit. As described above with respect to FIGS. 2A and 2B, drilling fluid 122 and the fractured rock may flow away from electrodes through fluid flow ports 260 on the face of the drill bit or on a ground ring of the drill bit.

At 312, the measurements obtained at 308 are analyzed to determine characteristics of the rock formation or for other purposes. For example, a sensor analysis system, such as sensor analysis system 150 in FIG. 1, may use the measurements to determine formation characteristics using electrical arc modeling, construct images of a formation and/or determine dip parameters at a boundary between two formation layers. The analysis may include one or more inversions, as described with respect to FIG. 5 and FIG. 6.

Modifications, additions, or omissions may be made to method 300 without departing from the scope of the disclosure. For example, the order of the steps may be performed in a different manner than that described and some steps may be performed at the same time. Additionally, each individual step may include additional steps without departing from the scope of the present disclosure. The operations of method 300 illustrated in FIG. 3 may be repeated, as needed, to perform a pulsed drilling operation.

Figure 4:
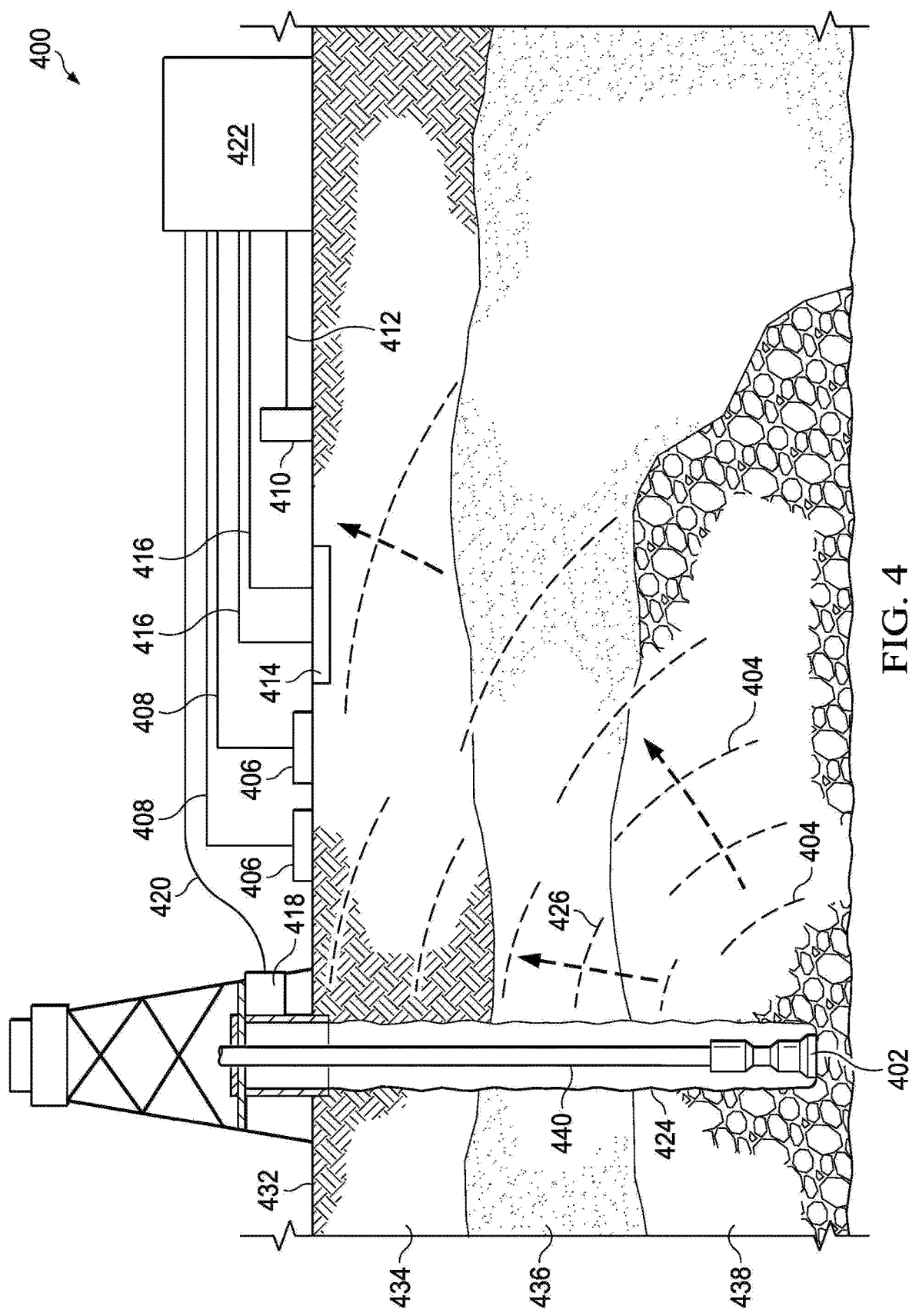
FIG. 4 is an elevation view of an exemplary measurement system associated with a pulsed drilling system.

FIG. 4 is an elevation view of an exemplary measurement system associated with a pulsed drilling system. Measurement system 400 may include sensor analysis system 422 that receives data from one or more of sensors 406, 410, 414 and 418 via one or more of interfaces 408, 412, 416, and 420. A pulsed-power drilling system may include pulsed-power drill bit 402 located at the distal end of wellbore 424. During pulsed drilling operations, electromagnetic waves 404 and acoustic waves 426 may be created by pulses generated at drill bit 402. Electromagnetic waves 404 may propagate through one or more subterranean layers 438, 436, 434 before reaching surface 432. Acoustic waves 426 may propagate uphole along wellbore 424 from drill bit 402 to surface 432 and travel through one or more subterranean layers 438, 436, 434. One or more of sensors 406, 410, 414 and 418 may be located in wellbore 424 and/or on surface 432. The sensors may be located a known distance from drill bit 402. The sensors may record responses to received signals including, but not limited to, high-energy electrical pulses, electrical arcs, or electromagnetic and/or acoustic waves 404 created during pulsed drilling operations. The sensors may send one or more measurements representing the recorded responses recorded to sensor analysis system 422, which analyzes the measurement data. One or more components of sensor analysis system 422 may be located on surface 432, in wellbore 424, and/or at a remote location. For example, sensor analysis system 422 may include a measurement processing subsystem in wellbore 424 that processes measurements provided by one or more of the sensors and transmits the results of the processing uphole to another component of sensor analysis system 422 for storage and/or further processing.

During pulsed drilling operations, high-energy electrical pulses are applied to the electrodes of drill bit 402 to build up electric charge at the electrodes. The rock in the surrounding formation fractures when an electrical arc forms at drill bit 402. Electromagnetic waves 404 are created by the current associated with the electrical arc and/or the electric charge built up on the electrodes of drill bit 402. In addition, acoustic waves 426 are created by the electrical arc and subsequent fracturing of rock in the formation proximate to the drill bit.

The duration of an electrical arc created during a pulsed drilling operation may be approximately 100 μs. The duration of the electrical arc may be shorter than the duration of the high-energy electrical pulses that are applied to the electrodes of drill bit 402, which may repeat on the order of several to a few hundred hertz. Because the duration of the electrical arc is less than the repetition period of the pulses, electrical arcs that are generated at drill bit 402 may be represented by a series of impulses in which each impulse has a corresponding electromagnetic wave and acoustic wave. The time at which the impulse occurs may be used to measure, map, and/or image subterranean features. If the repetition period of the series of impulses is Ts, the Fourier transform of the impulses in the frequency domain consists of impulses occurring at multiples of a base frequency ($f_0$) equal to $2n\pi/Ts$. If drill bit 402 provides pulses at a constant frequency, a range of corresponding discrete frequencies (e.g., $f_0$, $2f_0$, $3f_0$) are generated in the frequency domain. The discrete frequencies may be used to measure, map, and/or image subterranean features.

Electromagnetic waves 404 and/or acoustic waves 426 originate from and/or in proximity to drill bit 402 at the distal end of wellbore 424 and propagate outward. For example, electromagnetic waves 404 and/or acoustic waves 426 may propagate through one or more of subterranean layers 438, 436, 434. A boundary defining the extent of an individual subterranean layer and/or defining a transition between two subterranean layers may be referred to as a bed boundary. Although FIG. 4 illustrates a formation having three layers, the subterranean formation may include any number of layers suitable for pulsed drilling. Electromagnetic waves 404 and/or acoustic waves 426 created at and/or in proximity to drill bit 402 may propagate from layer 438 to the surface 432 via layers 434 and/or 436. Although electromagnetic waves 404 and acoustic waves 426 waves are illustrated in FIG. 4 as propagating in certain directions, electromagnetic waves 404 and acoustic waves 426 may propagate in any direction.

Sensors 406, 410 and/or 414 record responses to received signals including, but not limited to, high-energy electrical pulses, electrical arcs, or electromagnetic and/or acoustic waves. Sensors 406, 410 and 414 may convert the recorded responses into measurements and send the measurements to sensor analysis system 422. The measurements may be digital representations of the recorded responses. Although three sensors are illustrated, measurement system 400 may include any number of sensors of any suitable type to detect, receive, and/or measure an electric and/or magnetic field. The sensors may include any type of sensor that records responses from electromagnetic and/or acoustic waves including, but not limited to, the sensors illustrated in FIGS. 8A-8B, 9A, and 12 and described below.

Sensor 406 may be communicatively coupled via interface 408 to sensor analysis system 422, sensor 410 may be communicatively coupled via interface 412 to sensor analysis system 422, and sensor 414 may be communicatively coupled via interface 416 to sensor analysis system 422. Each sensor may provide differential or single-ended measurement data to sensor analysis system 422 via an interface. For example, sensor 406 is illustrated with interface 408 having two sub-interfaces to transmit differential measurement data to sensor analysis system 422.

Sensor analysis system 422 may receive measurements from one or more of sensors 406, 410 and 414, and store the measurements as a function of pulse index and time or frequency. The pulse index may begin at one and be incremented each time a new pulse is generated at drill bit 402 during a pulsed drilling operation. The measurements may be represented in the time domain or the frequency domain. In the time-domain, sensors 404, 410 and 414 may measure electromagnetic waves by determining a voltage or current and may measure acoustic waves by determining a pressure or displacement. In the frequency domain, a sensor may measure the amplitude and phase by recording responses to the received signal, such as a steady state monochromatic signal, or by performing a Fourier transform of the signal, such as a wide band signal.

Acoustic waves 426 originate at or near drill bit 402 and propagate uphole along wellbore 424 to surface 432 during a pulsed drilling operation. Sensor 418 may be located proximate to surface 432 and may record responses to the acoustic wave to provide measurements to sensor analysis system 422 via interface 420 such that sensor analysis system 422 may calculate the time at which the electrical arc is formed. Each acoustic wave may travel uphole to the surface along the casing of wellbore 424 and drill string 440 at a known velocity. For example, the acoustic wave travels at a velocity of approximately 5000 m/s if the casing and drill string 440 are formed of steel. Other materials suitable for pulsed drilling operations with known acoustic propagation velocities may be used for the casing and drill string 440. For example, the acoustic propagation velocity is between 50 and 2000 m/s for rubber, on the order of 6000 m/s for titanium, and on the order of 4000 m/s for iron. The time of the formation of the electrical arc may be determined based on the known propagation velocity of the material used to form the casing and drill string 440 and the distance between surface 432 and drill bit 402. The distance between drill bit 402 and surface 432 may be determined by depth and position information generated by known downhole survey techniques for vertical drilling, directional drilling, multilateral drilling, and/or horizontal drilling.

Although FIG. 4 illustrates one acoustic sensor at the surface, any number of acoustic sensors suitable to measure, map, and/or image subterranean features may be positioned at one or more locations on the surface or elsewhere. For example, an array of acoustic sensors may be used within the wellbore. The acoustic sensors in the array may be positioned at different locations within the wellbore, and may be oriented in different directions to record responses to propagating acoustic waves. The array may provide information about the surrounding formation at various depths sufficient for sensor analysis system 422 to form a three-dimensional image of the surrounding subterranean features.

The equipment shown in FIG. 4 may be land-based or non-land based equipment or tools that incorporate teachings of the present disclosure. For example, some or all of the equipment may be located on offshore platforms, drill ships, semi-submersibles, or drilling barges (not expressly shown). Additionally, while the wellbore is shown as being a generally vertical wellbore, the wellbore may be any orientation including generally horizontal, multilateral, or directional.

Sensor analysis system 422 may process measurements received from sensors 406, 410, 414 and/or 418 to determine characteristics of the surrounding formation and to generate predictions about the formation layers downhole from drill bit 402. For example, the sensor analysis techniques described herein may be used to detect and analyze geologic features considered to be drilling hazards. Detection of such hazards facilitate the use of more efficient drilling strategies or drilling directions which may, in turn, reduce the cost of the drilling process while increasing the rate of penetration (ROP). The data collected by various acoustic, electric or electromagnetics sensors or sensor arrays may be used to optimize the drilling process. For example, drilling speed, type of mud, BHA configuration (e.g., stabilizer positions) and/or other operating parameters may be modified to optimize a drilling process based on characteristics of the formation that are determined using the sensor data.

Figure 5:
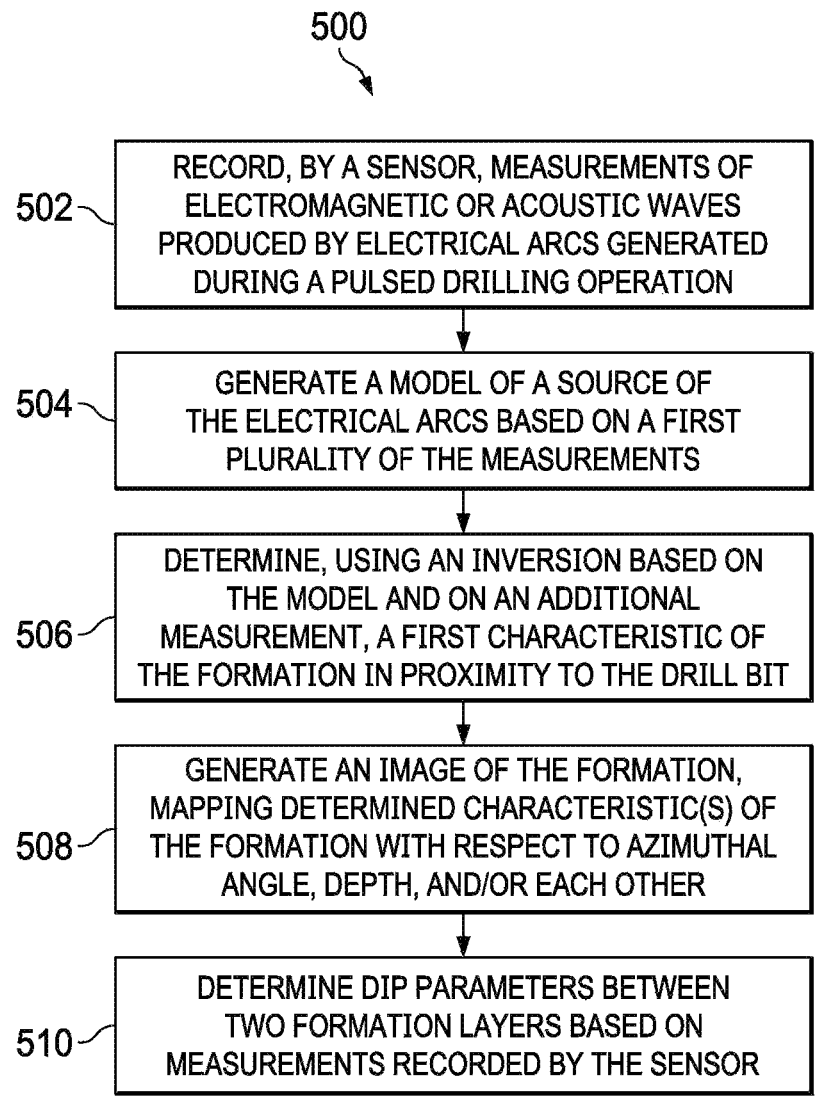
FIG. 5 is a flow chart illustrating an exemplary method for determining formation characteristics using electrical arc modeling.

FIG. 5 is a flow chart illustrating an exemplary method 500 for determining formation characteristics using electrical arc modeling. Method 500 may include, at 502, recording, by a sensor, measurements associated with electromagnetic and/or acoustic waves produced by electrical arcs generated during a pulsed drilling operation. For example, a pulsed drilling operation may be performed in a wellbore using a drill bit coupled to a pulse-generating circuit to generate electrical arcs and using a sensor to record responses to electromagnetic and/or acoustic waves produced by the electrical arcs. The drill bit may include at least two electrodes electrically coupled to the pulse-generating circuit to generate electrical arcs between the electrodes based on pulse drilling signals produced by the pulse-generating circuit during pulsed drilling operations. The electrical arcs may occur at different azimuthal locations between the electrodes. For example, for a first cycle of the pulse-generating circuit, an electrical arc may be generated in a first azimuthal location, and for a second cycle of the pulse-generating circuit, an electrical arc may be generated in a second azimuthal location.

The sensor may include at least one of an electromagnetic sensor, an acoustic sensor or an electrical sensor. The sensor may include a distributed acoustic sensing (DAS) system, such as DAS system 700 illustrated in FIG. 7 and described in detail below. The measurements may represent voltages, currents, measurements of electric field strength, measurements of magnetic field strength, or any combinations thereof. The measurements may be provided by the sensors to a sensor analysis system, where they may be analyzed or stored for subsequent processing. The sensor may be one of a plurality of sensors in a first array of sensors distributed along an azimuthal direction at a first axial position within and/or along a bottom-hole assembly, each of which records responses to electromagnetic waves or acoustic waves produced by the electrical arcs. The sensor may include, or be one of, a plurality of antennas positioned at different azimuthal orientations within and/or along a bottom-hole assembly, each of which records responses to electromagnetic waves and/or acoustic waves produced by the electrical arcs. The measurements may represent responses recorded by the sensor in the time domain and/or in the frequency domain. In one example, the measurements may represent responses recorded by the sensor with a period of approximately 250 milliseconds (ms) or less. In another example, the measurements may be complex-valued frequency domain measurements in the frequency range of approximately 10 to approximately 1000 Hertz (Hz).

Method 500 may include, at 504, generating a model of a source of the electrical arcs based on a first plurality of measurements recorded by the sensor. For example, a sensor analysis system may be configured to estimate an azimuthal angle representing an excitation direction based on responses recorded by the sensor. The sensor may be among multiple sensors within a first array of sensors. In one example, generating a model of a source of the electrical arcs may include generating a deterministic toroidal pulse source model by time-averaging data representing the locations and amplitudes of the electrical arcs. In another example, generating a model of a source of the electrical arcs may include determining, for each of the first plurality of measurements, an azimuthal angle representing an excitation direction and determining a respective number of measurements within the first plurality of measurements for which the determined azimuthal angle falls within each of a plurality of azimuthal angle ranges, as illustrated in FIG. 9B and described below. In this example, generating a model of a source of the electrical arcs may include generating a model of an effective source of the electrical arcs by calculating a weighted average of the measurements within the first plurality of measurements based on the respective number of measurements within the first plurality of measurements for which the determined azimuthal angle falls within each of the plurality of azimuthal angle ranges.

Figure 6:
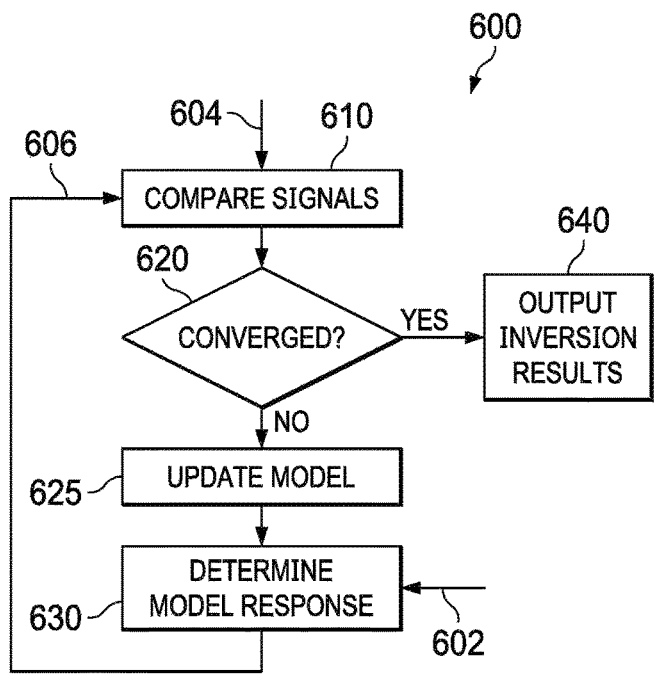
FIG. 6 is a flow diagram illustrating an exemplary inversion process.

Method 500 may include, at 506, determining a characteristic of the formation in proximity to the drill bit, such as around or ahead of the drill bit, using an inversion based on the model of the source and on an additional measurement recorded by the sensor. The additional measurement may represent a measurement of electromagnetic and/or acoustic waves produced by the same electrical arc or a different electrical arc generated during the pulsed drilling operation. The additional measurement may be of the same type as the first plurality of measurements. Determining the characteristic of the formation may include estimating an azimuthal angle representing an excitation direction by fitting a measurement representing a response to an electromagnetic wave and/or an acoustic wave produced by the electrical arc recorded by the sensor to the model. Once the sensor responses have been acquired, a forward model may be used to invert the measured responses to the formation parameters. Determining a characteristic of the formation may include the sensor analysis system performing an acoustic inversion based on the recorded acoustic waves, performing an electromagnetic inversion based on the recorded electromagnetic waves, or performing both an acoustic inversion and an electromagnetic inversion, either in series or as a joint inversion. The inversion may use unmodified measurements representing responses received from various acoustic, electrical or electromagnetic sensors, measurements that have been normalized or otherwise modified, or any combination of unmodified and modified measurements representing responses recorded by the sensors. An example inversion process is illustrated in FIG. 6 and described below.

Method 500 may include, at 508, generating an image of the formation that maps the determined characteristic, or more than one such characteristic, with respect to azimuthal angle, depth, and/or each other. For example, the method may include determining a respective value of a characteristic of the formation at two azimuthal angles, determining a respective value of another characteristic of the formation at the two azimuthal angles, and constructing an image depicting values of the characteristics of the formation with respect to azimuthal angle. Constructing the image may include, for each of a plurality of azimuthal angles other than the two azimuthal angles at which the first and second characteristics were determined, interpolating between values of the first characteristic of the formation or the second characteristic of the formation at the two azimuthal angles or extrapolating a value of the characteristics of the formation at one of the two azimuthal angles. Examples of these types of images are shown in FIGS. 11A through 11C.

Method 500 may include, at 510, determining one or more dip parameters between two formation layers based, at least in part, on measurements taken by the sensor. For example, as described in more detail below in reference to FIG. 12, the sensor analysis system may be configured to determine at least one of an inclination angle at which the drill bit crosses a boundary between two layers within the formation and a strike angle at which the drill bit crosses a boundary between two layers within the formation.

Modifications, additions, or omissions may be made to method 500 without departing from the scope of the disclosure. For example, in some embodiments of the present disclosure, one or both of the operations shown as steps 508 and 510 may be omitted, or the results of the inversion performed at step 506 may be used for purposes other than, or in addition to, generating an image or determining dip parameters. The order of the steps illustrated in FIG. 5 may be performed in a different manner than that described and some steps may be performed at the same time. Additionally, each individual step may include additional steps without departing from the scope of the present disclosure.

Responses recorded by acoustic, electrical and electromagnetic sensors within or associated with a pulsed-power drilling system may be used in an inversion process as recorded or may be processed to generate differential responses to be used in determining characteristics of the formation downhole of a drilling tool. One example method for obtaining differential responses includes subtracting the sensor responses from each of the other responses in the complex voltage domain, or using a logarithm of the complex voltage domain. A second example method for obtaining differential responses may include calculating the differences between pairs of responses recorded by each sensor at two different positions, through subtraction, as the tool advances through the formation layers. A third example method for obtaining differential responses may include a combination of the first and second example methods such that differences are calculated, through subtraction, between the differential responses generated for each pair of sensors at two different positions. The differential responses provided by any of these methods may be then processed using one or more inversion techniques that are designed to operate based on differential responses.

Determining a first characteristic of a formation in proximity to the drill bit may include determining a characteristic of a bed boundary within the formation. The determined characteristic may include at least one of a dielectric constant, a resistivity, an impedance, a conductivity, a permeability, a density, a velocity, a Young's modulus and a magnetic susceptibility, or any combination thereof. An inversion that solves for electrical properties of the formation and/or bed boundary information may use data that has been azimuthally binned in one or more dimensions, as described in more detail with respect to FIG. 9B.

FIG. 6 is a flow diagram illustrating an exemplary inversion process. In this example, inputs to inversion process 600 include model generation inputs 602 and received signals 604. Model generation inputs 602 may include a model of the source of electrical arcs, such as a deterministic toroidal source model or an electric dipole source model. Model generation inputs 602 may be used to determine a model response, as shown in 630, including various model parameters and estimated signals 606. For example, the model response may include electrical and/or acoustic properties associated with the estimated type of rock, which may include a representation of the properties in accordance with azimuthal binning. Estimated signals 606 may include estimates of the type of rock, as determined by the inversion process. Received signals 604 may include any combination of unmodified measurements representing responses recorded by various acoustic, electrical or electromagnetic sensors and/or measurements derived from raw information recorded by the sensors, for example responses that have been normalized or otherwise modified as described herein. Received signals may include one or more measurements, such as a voltage, a current, ratio of a voltage to a current, an electrical field strength, or a magnetic field strength of the electromagnetic and/or acoustic waves created during pulsed drilling operations. The characteristic may represent a value in the time or frequency domain. In the frequency domain, for example, absolute values of received signals 604 may be used at discrete frequencies. As another example, the ratios of received signals 604 at different frequencies may be used in the inversion. The ratio of received signals 604 may reduce or filter out any undesirable factor in received signals 604, such as the borehole effect or amplitude and/or phase fluctuations in the excitation of the electrical pulse or electric arc. The inversion may consider the ratio of received signals 604 at different frequencies to be one received signal at one frequency.

As shown at 610, received signals 604 may be compared with estimated signals 606 to determine whether there is a mismatch between received signals 604 and estimated signals 606. If there is a mismatch between the signals, rather than a convergence, the model parameters may be updated, as shown in 625, and an updated model response may be determined, as shown in 630. When and if there is convergence between received signals 604 and estimated signals 606, the results of the inversion process may be output, as shown in 640. For example, if a match is found between a model response for an estimated type of rock and received signals 604, formation characteristics of the estimated type of rock may be output as formation characteristics of the rock located ahead of the drill bit and/or bed boundary information.

In one example, a pulsed-power drilling system with an associated sensor analysis system may include a second array of azimuthally distributed sensors at a second axial position in the bottom-hole assembly, each of which records responses to electromagnetic waves or acoustic waves produced by the electrical arcs simultaneously with the plurality of sensors in the first array of sensors. In this example, the inversion may be based on a ratio between a measurement representing a response recorded by a first sensor in the first array of sensors in a given azimuthal direction and a measurement representing a response recorded by a second sensor in the second array of sensors in the given azimuthal direction.

In another example, the inversion may be based on a difference between a measurement representing a response recorded by a first sensor in the first array of sensors in a given azimuthal direction and a measurement representing a response recorded by a second sensor in a second array of sensors in the given azimuthal direction. In yet another example, determining a first characteristic of a formation in proximity to the drill bit may include fitting a measurement representing a response recorded by a first sensor in the first array of sensors in a given azimuthal direction and a measurement representing a response recorded by a second sensor in the second array of sensors in the given azimuthal direction to the model of the source of the electrical arcs.

While particular types of electromechanical and acoustic sensors are described above in reference to FIG. 4, in some embodiments a pulsed-power drilling system with an associated sensor analysis system may include an electromagnetic/acoustic sensor array that is implemented using an optical fiber of a distributed acoustic sensing (DAS) system.

FIG. 7 is a block diagram of an exemplary distributed acoustic sensing (DAS) subsystem 700 used to collect and analyze data from acoustic sensors. Acoustic sensing based on DAS may use the Rayleigh backscatter property of an optical fiber and may spatially detect disturbances that are distributed along the length of the optical fiber. A DAS subsystem may also detect reflections from fiber Bragg gratings (FBGs) or fiber optic partial mirrors added to a fiber optic cable. Such systems may rely on detecting phase changes brought about by changes in strain (e.g., caused by acoustic waves) along the length of an optical fiber. Externally-generated acoustic disturbances may create very small strain changes, which translate into phase changes of the reflected light along the optical fiber. The phase changes may be measured by taking measurements of light signals from two different points along the fiber in order to determine an average amount of strain over that distance.

DAS subsystem 700 may be positioned at the surface for use with pulsed-power drilling system 100 as illustrated in FIG. 1, or at any other suitable location. DAS subsystem 700 may be coupled to an optical fiber 718 that is positioned within a portion of the pulsed-power drilling system 100. For example, optical fiber 718 may be positioned within a wellbore, for example wellbore 116 illustrated in FIG. 1. Any suitable number of DAS subsystems (each coupled to an optical fiber 718 located downhole) may be placed inside or adjacent to wellbore 116. With optical fiber 718 positioned inside a portion of wellbore 116, DAS subsystem 700 may determine information associated with formation 118 based on changes in strain caused by acoustic waves. DAS subsystem 700 may be configured to transmit optical pulses into optical fiber 718, and to receive and analyze reflections of the optical pulse to detect changes in strain caused by acoustic waves.

DAS subsystem 700 may include interrogation controller 702 that directs various components of DAS subsystem 700 to perform distributed acoustic sensing. Interrogation controller 702 may include processor 704, memory 706, and storage 708, communicatively coupled to one another. Interrogation controller 702 may also be communicatively coupled to light source 710, reflection receiver 712, and output 716. In some embodiments, interrogation controller 702 may be configured to direct light source 710, reflection receiver 712 and/or output 716 to perform tasks associated with distributed acoustic sensing. Light source 710 may generate interrogating optical pulses using light from a laser.

Within interrogation controller 702, processor 704 may process instructions (e.g., from memory 706 and/or storage 708) and perform calculations associated with the distributed acoustic sensing. Processor 704 may include a microprocessor, microcontroller, digital signal processor (DSP), application specific integrated circuit (ASIC), or any other digital or analog circuitry configured to interpret and/or execute program instructions and/or process data. Processor 704 may be configured to interpret and/or execute program instructions and/or data stored in memory 706 to carry out distributed acoustic sensing. For example, program instructions stored in memory 706 may constitute portions of software for using time-domain reflectometry and/or frequency-domain reflectometry to detect information about formation 118 based on detected changes in strain on fiber optic cable 718 caused by acoustic waves.

Also within interrogation controller 702, memory 706 may store data and instructions used by processor 704 in carrying out the distributed acoustic sensing. As such, memory 706 may include any system, device, or apparatus configured to hold and/or house one or more memory modules. For example, memory 706 may include read-only memory, random access memory, solid state memory, or disk-based memory. Each memory module may include any system, device, or apparatus configured to retain program instructions and/or data for a period of time (e.g., computer-readable non-transitory media).

Also within interrogation controller 702, storage unit 708 may provide and/or store data and instructions used by processor 704 to perform the distributed acoustic sensing. In particular, storage unit 708 may store data that may be loaded into memory 706 during operation. Storage unit 708 may be implemented in any suitable manner, such as by functions, instructions, logic, or code, and may be stored in, for example, a relational database, file, application programming interface, library, shared library, record, data structure, service, software-as-service, or any other suitable mechanism. Storage unit 708 may store and/or specify any suitable parameters that may be used to perform distributed acoustic sensing. For example, storage unit 708 may provide information used to direct components of DAS subsystem 700 to transmit optical pulses, receive reflections from the optical pulses, and/or analyze the reflections to detect information about formation 118 based on detected changes in strain on fiber optic cable 718 caused by acoustic waves. Storage unit 708 may provide information used to transmit optical pulses with suitable timing, such as timing the optical pulses to be transmitted close to one another but not so close that reflections from the optical pulses overlap. Information stored in storage unit 708 may also facilitate correlating reflections received with particular times and corresponding physical locations, and analyzing reflections to detect changes in strain on fiber optic cable 718 caused by acoustic waves and resolve the locations at which acoustic waves are affected by particular characteristics of formation 118. Storage unit 708 may also be used to log and/or store information about optical pulses transmitted, reflections received, and/or information derived from analyzing the reflections for later use or further analysis.

As shown, output 716 may be configured to convey information determined by interrogation controller 702 to onsite and/or offsite operators associated with ongoing operations at the well system. For example, output 716 may be communicatively coupled to interrogation controller 702 and may include one or more display consoles or output logs configured to display information about formation 118 based on detected changes in strain on fiber optic cable 718 caused by acoustic waves. Specifically, output 716 may display or otherwise provide information such as a characteristic of formation 118, a location at which acoustic waves are affected by a particular characteristic of formation 118 or other information gleaned by interrogation controller 702 based on its analysis.

DAS subsystem 700 may also include light source 710. Light source 710 may be any component configured to generate and/or condition an optical pulse for distributed acoustic sensing. For example, light source 710 may include, without limitation, a laser source (e.g., a coherent laser source) that generates the optical pulse, a semiconductor optical amplifier that switches the laser source, a booster amplifier such as an erbium doped fiber amplifier (EDFA) that increases the maximum power of the optical pulse, and/or one or more active or passive filters that narrow and otherwise condition the optical pulse.

DAS subsystem 700 may also include a reflection receiver 712. Reflection receiver 712 may be any component configured to receive optical reflections (e.g., Rayleigh backscatter) and/or convert the optical reflections into analog or digital electrical signals that may be analyzed by interrogation controller 702. For example, reflection receiver 712 may include a photodiode configured to convert light from received reflections into an electrical signal. Reflection receiver 712 may also perform signal conditioning on the optical reflections and/or on the converted electrical signal. For example, reflection receiver 712 may include one or more filtering components configured to filter certain sidebands to decrease noise and narrow in on an information-carrying signal at a central frequency of the reflections. In this way, reflection receiver 712 may attempt to increase a signal-to-noise ratio, which may facilitate the analysis of the reflections to detect information about formation 118 based on detected changes in strain on fiber optic cable 718 caused by acoustic waves.

DAS subsystem 700 may also include power circulator 714. Power circulator 714 may be any suitable component that simultaneously transmits optical energy into an optical fiber while receiving optical energy from the optical fiber. Power circulator 714 may thus be configured to operate as a "roundabout" for optical energy going into and coming out of optical fiber 718. Power circulator 714 may receive optical energy such as an optical pulse from light source 710 and transmit the energy into optical fiber 718. Power circulator 714 may also receive optical energy such as reflections of the optical pulse from optical fiber 718 and deliver the reflected energy to reflection receiver 712. Power circulator 714 may be coupled with the uphole end of optical fiber 718 at bulkhead connector 720 and may transmit and receive optical energy through bulkhead connector 720.

In operation, DAS subsystem 700 may perform distributed acoustic sensing on optical fiber 718 to detect information about a formation based on detected changes in strain on fiber optic cable 718 caused by acoustic waves. Specifically, interrogation controller 702 may direct light source 710 to generate an optical pulse. The optical pulse may be transmitted into optical fiber 718 via power circulator 714 and bulkhead connector 720. Transient acoustic signatures based on acoustic waves produced by a pulsed drilling operation may cause reflections of the optical pulse to be generated as the optical pulse is transmitted through optical fiber 718. Reflection receiver 712 may receive the reflections via power circulator 714 and may convert the optical energy of the reflections into an electrical signal that may be processed by interrogation controller 702. Interrogation controller 702 may analyze the signal indicative of the received reflections using time-domain reflectometry, frequency-domain reflectometry, or other methodologies to detect information from the optical pulse. Accordingly, interrogation controller 702 may derive information detect information about the formation based on detected changes in strain on fiber optic cable 718 caused by acoustic waves and display the information to human operators using output 716.

The elements shown in FIG. 7 are exemplary only and DAS subsystem 700 may include fewer or additional elements in other embodiments. Modifications, additions, or omissions may be made to DAS subsystem 700 without departing from the scope of the present disclosure. For example, DAS subsystem 700 illustrates one particular configuration of components, but any suitable configuration of components may be used. Components of DAS subsystem 700 may be implemented either as physical or logical components. Furthermore, in some embodiments, functionality associated with components of DAS subsystem 700 may be implemented with special and/or general purpose circuits or components. Components of DAS subsystem 700 may also be implemented by computer program instructions.

In the pulsed-power drilling systems described herein, at least one receiving antenna may be placed on a bottom-hole assembly.

FIG. 8A is an elevation view of exemplary components of a drilling system including a sensor associated with a bottom-hole assembly (BHA) of the drilling system. Drilling system 800 may include pulsed-power drill bit 806, bottom-hole assembly (BHA) 804, and drill string 810. Drill bit 806 may receive power via cable 812 to provide high-energy electrical pulses to the electrodes (not expressly shown) of drill bit 806. The high-energy electrical pulses create electrical arcs through formation 808 surrounding wellbore 802. The electrical arcs fracture rock in formation 808, which is carried away by drilling fluid 814. In addition to causing the rock to fracture, the electrical arcs generate electromagnetic and/or acoustic waves that may be measured by sensor 816. Sensor 816 may be communicatively coupled to a sensor analysis system, such as sensor analysis system 150 in FIG. 1, sensor analysis system 422 in FIG. 4 or sensor analysis system 1300 in FIG. 13. Power may be delivered to sensor 816 by, for example, cable 812. As another example, sensor 816 may be powered by a battery (not expressly shown). As a further example, sensor 816 may receive power by a laser (not expressly shown) through an optical fiber deployed downhole, such as optical fiber 160 in FIG. 1 or optical fiber 718 in FIG. 7. A conversion unit, such as a photovoltaic cell, within bottom-hole assembly 804 may convert light from the laser into electrical energy to power sensor 816.

Sensor 816 may include an antenna that is tilted as shown or that is coaxially oriented. Sensor 816 may receive a signal representing the electromagnetic wave created during a pulsed drilling operation and record responses at a particular orientation. The antenna of sensor 816 may be rotated along the centerline of BHA 804 in order for sensor 816 to record responses at different orientations. For example, the antenna in sensor 816 may be rotated to different azimuthal positions of approximately 0, 90, 180, and 270 degrees. Any number of responses at different azimuthal positions may be recorded to generate two-dimensional information about the surrounding formation including, but not limited to the average direction of electrical arcs. The antenna of sensor 816 may be rotated in any suitable manner for taking measurements. For example, if sensor 816 includes a tilted coil, the tilted coil may be rotated by rotating BHA 804 using drill string 810. Although the rotation of BHA 804 may increase interference with recorded responses of low-frequency electromagnetic waves, such as electromagnetic waves having a frequency of approximately 100 Hz and below, the exemplary tilted coil may be azimuthally sensitive to electromagnetic waves, which may have a frequency above approximately 100 Hz. As another example, a motor located proximate the antenna of sensor 816 may rotate the antenna at a rate independent of the rate at which BHA 804 may rotate during pulsed-power drilling operations. Sensor 816 may record responses to the electromagnetic waves and send measurements to a sensor analysis system to determine information about the surrounding formation, such as the dielectric constant of the formation, resistivity of the formation, magnetic permeability of the formation, resistivity anisotropy of the formation, layer positions, density of the formation, compressional velocity of the formation, shear velocity of the formation, or the bed boundaries around and ahead of drill bit 806.

FIG. 8B is an elevation view of exemplary components of a drilling system including multiple sensors associated with a bottom-hole assembly (BHA) of the drilling system. Drilling system 820 may include pulsed-power drill bit 806, bottom-hole assembly (BHA) 804, and drill string 810. Similar to drilling system 800 in FIG. 8A, high-energy electrical pulses may be provided to the electrodes (not expressly shown) of drill bit 806 to create electrical arcs through the formation 808 surrounding the wellbore (not expressly shown). The electrical arcs fracture rock in the formation and generate electromagnetic and/or acoustic waves that may be measured by sensor assembly 822. Sensor assembly 822 may be communicatively coupled to a sensor analysis system, such as sensor analysis system 150 in FIG. 1, sensor analysis system 422 in FIG. 4 or sensor analysis system 1300 in FIG. 13. For example, sensors 816a, 816b, and 816c may be housed within one or more sensor assemblies. Each sensor may include an antenna, such as a tilted coil as shown. The antennas within sensor assembly 822 may be of the same or different types. The antennas of sensors 816a, 816b, and 816c may be oriented with different azimuthal directions to allow for azimuthal sensitivity to the electromagnetic waves emitted during pulsed-power drilling operation. Responses may be recorded by each of the sensors, which may convert the responses into measurements that are sent to a sensor analysis system. Measurements representing these responses may subsequently be used by the sensor analysis system to determine an excitation direction of the electrical arcs in terms of an azimuth angle. For example, the measurements may be organized in a series of bins that correspond to the received azimuthal direction of the electrical arcs, as shown in FIG. 9B.

In the pulsed-power drilling systems described herein, individual electrical arcs may occur at random azimuthal locations between electrodes of a drill bit. In these systems, the BHA may have rotational symmetry, whereas the electrical arcs do not. The random electrical arc excitation may be statistically modeled as an equivalent toroidal source that would generate the same signal as a time-averaged signal generated at the acoustic, electrical or electromagnetic sensors that receive and record responses to acoustic and/or electromagnetic waves produced by the electrical arcs. Statistical averaging may be performed by the receiving sensors or by arrays of such sensors by listening to the signal over a certain period of time. For example, hundreds of excitation pulses may be averaged at the receiving sensors. A moving average may be performed in real time, since recording all signals and averaging them in post-processing may be cost or space prohibitive in the BHA environment. Detecting the direction of an electrical arc may involve finding the maximum of all signal magnitudes recorded by sensors in an array, finding multiple ones of the first, second, third and fourth largest magnitudes and performing an interpolation operation, or matching a response to one of a set of modeling responses corresponding to different azimuths.

Figure 9A:
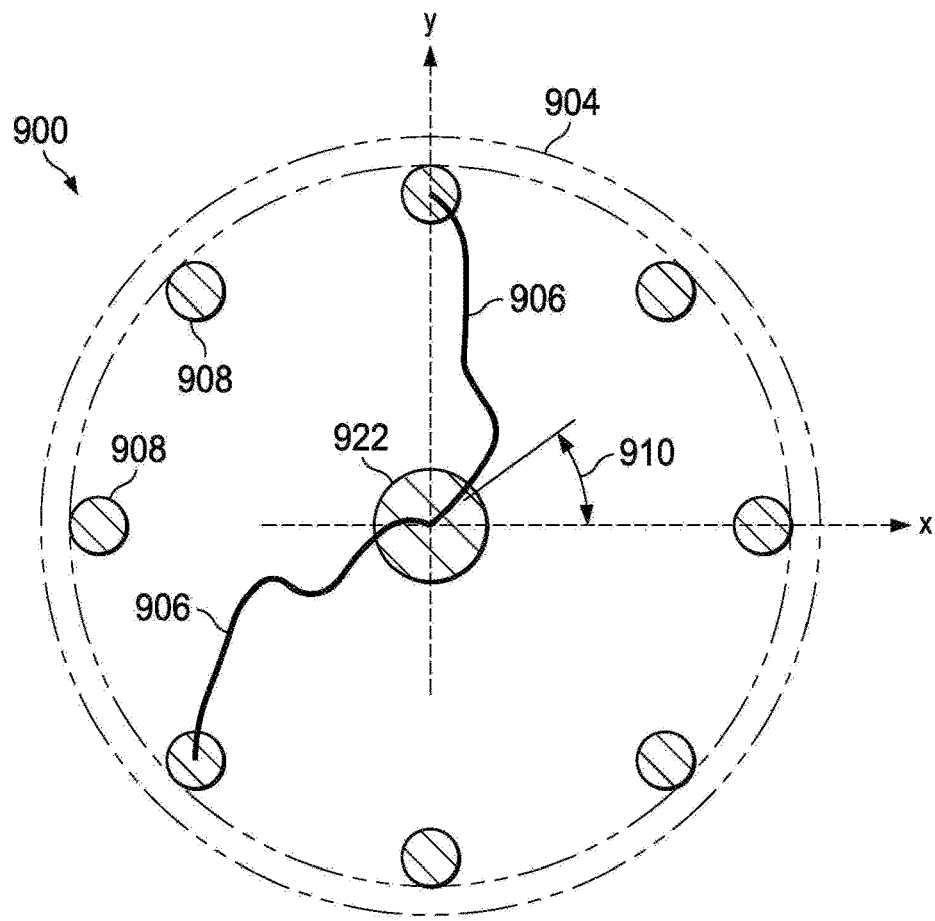
FIG. 9A is a bottom up view of exemplary components of a pulsed-power drill bit with an associated sensor analysis system.
Figure 9B:
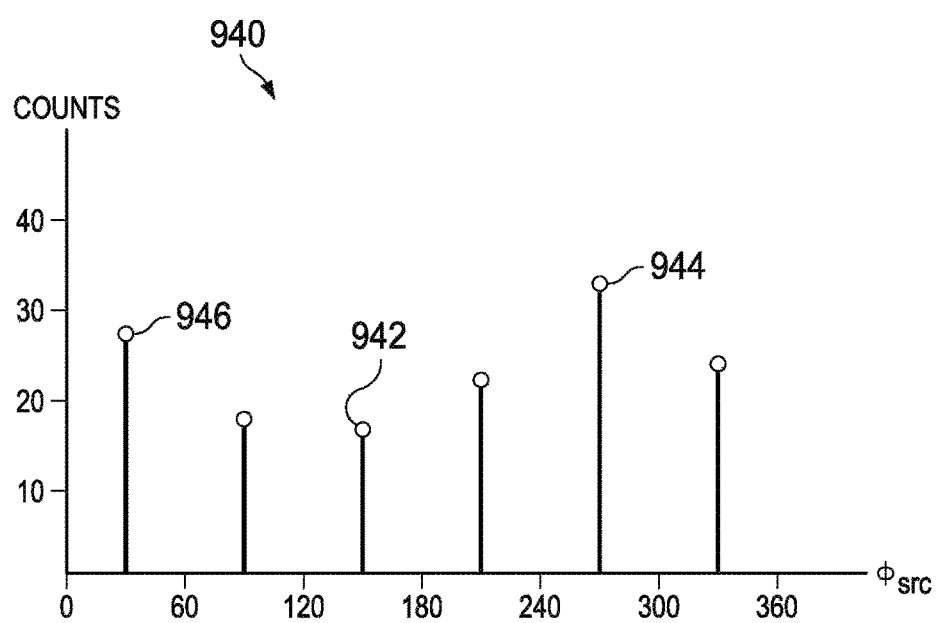
FIG. 9B is a graph illustrating bins for measurements from multiple sensors azimuthally distributed around a centerline of the bottom hole assembly (BHA) of the pulsed-power drilling system.

FIG. 9A illustrates a bottom up view of exemplary components of a pulsed-power drill bit with an associated sensor analysis system. Drill bit 900 may include one or more center electrodes, such as center electrode 922, and one or more outer electrodes disposed proximate outer wall 904. For example, the electrodes of drill bit 900 may have a configuration as shown in FIGS. 2A and 2B. Electrical arcs 906 may form during pulsed-power drilling operations between center electrode 922 and electrodes proximate outer wall 904.

Electrical arcs 906 may be detected by sensors 908 azimuthally distributed along outer wall 904. Responses may be recorded by each of the sensors 908. Sensors 908 may be magnetometers, buttons, current-meters, or any sensor suitable for detecting, measuring, and/or recording responses corresponding to electrical arcs 906. Measurements representing these responses may be used to determine an excitation direction in terms of an azimuth angle, such as azimuthal angle 910. For example, measurements representing raw recorded responses and/or modified measurements may be inputs to an inversion process, as described with respect to FIG. 5 and FIG. 6.

FIG. 9B is a graph illustrating bins for measurements from multiple sensors azimuthally distributed around a centerline of the bottom-hole assembly (BHA) of the pulsed-power drilling system. Responses from the azimuth sensors, such as sensors 908 in FIG. 9A, may be organized into a series of bins that correspond to the azimuthal location or angle ($\phi$scr) of the electrical arcs. For example, each of the azimuth sensors may be placed at different azimuthal locations. Each sensor may provide one or more measurements corresponding to an electrical arc to a sensor analysis system, such as sensor analysis system 150 in FIG. 1, sensor analysis system 422 in FIG. 4 or sensor analysis system 1300 illustrated in FIG. 13. For example, the sensor analysis system may compare measurements between the sensors to determine the measurement with the highest amplitude. The azimuthal direction for an electrical arc may be determined based on the azimuthal location of the sensor with the highest amplitude measurement. As another example, the azimuthal direction for an electrical arc may be determined based an average azimuthal direction. The sensor analysis system may average the measurements between adjacent sensors and then compare the measurements between the averaged values to determine the measurements with the highest average amplitude. The azimuthal direction for an electrical arc may be determined based on the average azimuthal location between two adjacent sensors with the highest average amplitude measurement. The measurements by the sensors may also be evaluated over many electrical arcs during pulsed-power drilling operations. The sensor analysis system may determine the azimuthal direction for an electrical arc and increment the count of a counter corresponding to the azimuthal direction. Over many electrical arcs, counters corresponding to different azimuthal directions may be incremented.

In the graph shown in FIG. 9B, the horizontal axis represents the azimuthal location ($\phi$src) and the vertical axis represents the number of electrical arcs binned at a particular azimuthal location. Each line in the graph represents a counter corresponding to an azimuthal direction. For example, line 946 represents a counter corresponding to an azimuthal direction of 30 degrees and line 944 represents a counter corresponding to an azimuthal direction of 270 degrees. Although the lines are shown representing counters corresponding to azimuthal directions 60 degrees apart (e.g., 30 degrees, 90 degrees, 150 degrees, etc.), any number of counters may be used.

Although the graph shows bins that correspond to the azimuthal location of the electrical arcs ($\phi$src), the sensor analysis system may make determinations regarding pulsed-power drilling operations based on bins that correspond to the azimuthal location of the received responses ($\phi$rcv) as determined from measurements by one or more sensors located uphole from the drill bit, such as sensors 816a, 816b, and 816c that are shown oriented with different azimuthal directions in FIG. 8B or sensor 816 as shown in FIG. 8A. Though the graph shows measurements organized into a series of bins, measurements from sensors may be organized into a two-dimensional array of bins, in which one dimension corresponds to the azimuthal direction of the electrical arcs ($\phi$src) measured by the azimuth sensors and the other dimension corresponds to the azimuthal direction of the received responses ($\phi$rcv) as determined from measurements by one or more sensors.

As shown in FIG. 9B, the sensor analysis system may organize measurements into a series of bins, in which each bin corresponds to an azimuthal direction and contains a counter representing the number of electric arcs formed in the azimuthal direction of the bin. The sensor analysis system may make determinations regarding pulsed-power drilling operations based on the azimuthal direction associated with the counter having the greatest number of counts. Responses recorded by azimuthally distributed sensors may be used in estimating the values of formation parameters downhole from the tip of a drilling tool. These formation parameters may represent electrical and/or acoustic properties of the formation. For example, electrical parameters that may be estimated based on responses recorded by azimuthally distributed sensors include electrical conductivity $\sigma$, permeability $\varepsilon$, and electrical resistivity, which is the inverse of electrical conductivity. Acoustic parameters that may be estimated based on responses recorded by the azimuthally distributed sensors include density d, shear velocity Vs, compressed velocity Vc, and Young's modulus.

Figure 10:
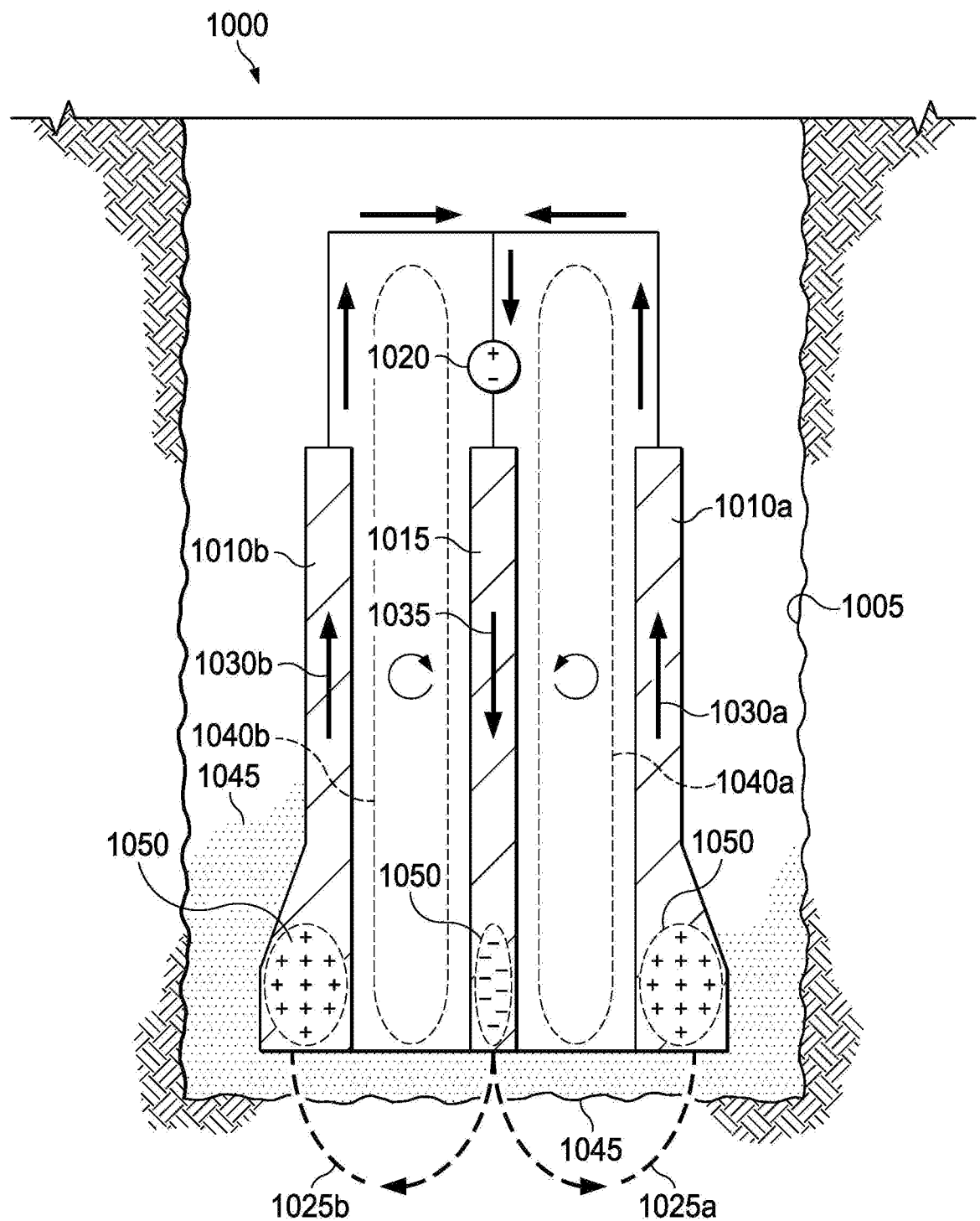
FIG. 10 is a block diagram illustrating an exemplary model for a source of electrical arcs.
Figure 11:
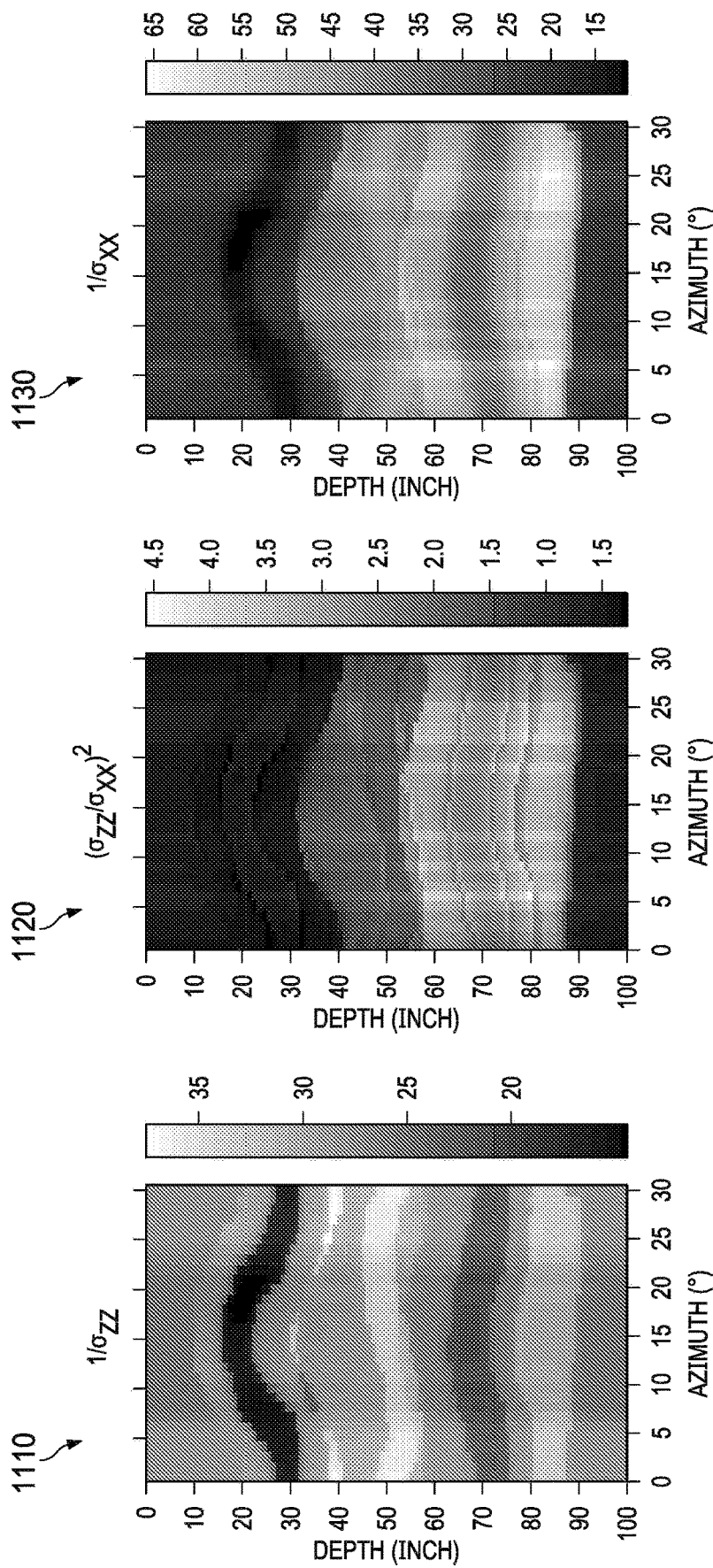
FIGS. 11A to 11C are exemplary images produced using multi-component sensors of a pulsed-power drilling system with an associated sensor analysis system.

FIG. 10 is a block diagram illustrating an exemplary model for a source of electrical arcs. The model may be used in an inversion, as described with respect to FIG. 5 and FIG. 6. In the pulsed-power drilling systems described herein, electrical arcs do not have rotational symmetry around a centerline of the bottom-hole assembly (BHA) and individual electrical arcs may occur at random azimuthal locations between electrodes of a drill bit. A toroidal source model may be used to statistically estimate the excitation of the electrical arcs. More specifically, the toroidal source model may be used to generate a time-averaged signal that is the same as the measurements representing responses recorded by the electrical or electromagnetic sensors. The receiving sensors may record responses to received signals including, but not limited to high-energy electrical pulses, electrical arcs, or electromagnetic waves. The receiving sensors or arrays of such sensors may perform statistical averaging by recording responses to the received signals over a certain period of time. For example, hundreds of excitations of the electrical pulses may be averaged at the receiving sensor. A moving average may be performed in real time, because recording all signals and averaging them in post-processing may be cost or space prohibitive in the BHA environment.

An equivalent excitation of the electrical arcs that generates the same signal as a time-averaged signal generated at the receiving sensors, modeled as a toroidal pulse source model 1000, is illustrated in FIG. 10. In the example illustrated in FIG. 10, it is assumed that individual electrical arcs may form at random locations on the pulsed-power drill bit. For example, electrical arcs may form between electrodes 208 and 210 as illustrated in FIG. 2A or between electrode 212 and ground ring 250 as illustrated in FIG. 2B. Many such arcs may occur consecutively in time, with a frequency and intensity determined by the pulse scheme used for the drilling operation. The surrounding formation and the receiving sensors may behave linearly with the electrical arc excitation and the locations of the arcs and their random amplitude fluctuations may be time-averaged at the receiving sensors to arrive at toroidal pulse source model 1000.

Model 1000, which may be referred to as an equivalent deterministic source model, includes voltage source 1020, and one or more electrodes as shown in FIGS. 2A and 2B. The voltage source may provide charge 1050 on the end of electrodes 1015, 1040a, and 1040b via high-energy electrical pulses. In this equivalent deterministic source model, constant-amplitude pulsed currents 1035 flow downhole uniformly over the center electrode 1015, pass through the formation and/or drilling fluid 1045 along a semi-toroidal surface represented by currents 1025a and 1025b, and flow uphole uniformly along the outer wall of the drill bit at 1010a and 1010b as currents 1030a and 1030b. The two opposite paths of the current flow are indicated by dashed loops 1040a and 1040b shown in the annular region between the center electrode 1015 and the outer wall represented by 1010a and 1010b. In this equivalent deterministic source model, both the BHA and the current paths have rotational symmetry around the BHA axis. The toroidal source may behave like an electric dipole oriented parallel to the BHA.

When processing measurement data received from electromagnetic or acoustic sensors to determine formation characteristics, determine dip parameters, or construct an image of a formation, reducing or eliminating the effects of the randomness of the electrical arc locations may simplify the process. An entirely deterministic source model may be inserted into an inversion process that solves for electrical properties of the formation information such as resistivity, impedance, resistivity anisotropy, and at-bit resistivity, and/or bed boundary, such as the distance to a bed boundary, the orientation of a bed boundary, and the resistivities of the formation layers at a bed boundary.

In order to reduce or eliminate the effect of variations of the pulsed source (i.e., the electrical arcs) with respect to time, a ratio of measurements may be used in the processing rather than individual measurements. In an example embodiment, two arrays of sensors may be located at different axial positions along the BHA. Ratios of measurements from two sensors in the same azimuth may be used in the inversion process, rather than the measurement from a single sensor or sensor array. For example, if a first array of sensors includes sensors S1 . . . SN, and a second array of sensors includes sensors T1 . . . TN, voltage ratio measurements calculated as $V_{S1}/V_{T1}, \ldots V_{SN}/V_{TN}$ may be used instead of $V_{S1}$ or $V_{T1}$, individually. In this example, the distance between the sensors may determine the vertical resolution of the system. Therefore, the use of a larger number of sensors distributed along the azimuthal direction may increase the azimuthal resolution of the system. Multi-axial magnetic dipoles or buttons may be used as the receivers.

In this example, the received signal is passed through an inversion process or another sensor analysis process to convert the received electrical signals, recorded as voltages or currents, to corresponding electromagnetic and/or acoustic properties of a formation. A look-up table may be used to calculate apparent formation parameters, such as apparent resistivity, assuming the responses at each sensor are based on waves passing through a homogeneous formation. A more complicated inversion may be used to handle cases in which layer boundaries need to be resolved as well. In addition to solving for formation characteristics, the inversion or other sensor analysis process may solve for stand-off as a function of azimuth and depth. The result of the inversion or other sensor analysis processing may be a determination of the parameters that lead to a modeled signal that matches the measured signal. When calculating the modeled signal, any of various modeling techniques may be used including, without limitation, finite difference, finite element, method of moments, or integral equation techniques.

In another example, in order to reduce or eliminate the effect of variations of the pulsed source (i.e., the electrical arcs), an average of measurements may be used in the processing rather than individual measurements. For example, results based on a number of measurements may be averaged to obtain a measurement that is equivalent to a pulsed source of an azimuthally uniform nature. As another example, a weighted average of each measurement may be used in which the weights are chosen to create an effectively non-azimuthal (azimuthally symmetric) source. This may be accomplished by (i) measuring the strength and direction of each pulse using voltage and current values that are available at the source or are obtained from measurements that are made close to the source; (ii) constructing a vector for each pulse including the corresponding direction and strength; (iii) considering the sum of all vectors including weighting coefficients; (iv) identifying coefficients that will lead to a zero magnitude vector; and (v) applying the identified coefficients to each of the measurements to synthetically create a non-azimuthal measurement.

A sensor analysis system associated with a pulsed-power drilling system may be configured to estimate a parameter of interest along the azimuthal direction at a particular azimuthal angle φ. Variations in the value of the parameter of interest at different azimuthal angles φ may indicate differences in the characteristics of a formation in different directions relative to the drill bit, which may be used to direct or modify a pulsed drilling operation. For example, the sensor analysis system may be configured to determine a more efficient drilling strategy or drilling direction based on differences in the electrical resistivity of the formation in different directions relative to the drill bit.

The data collected with azimuthally distributed sensors may be used for two-dimensional or three-dimensional imaging of the drilled wellbore. Since the acquired data carries information from the parameters of the formation along the azimuthal direction, qualitative images may be constructed based on the electromagnetic and/or acoustic sensors. In addition, image fusion techniques may be used to combine images constructed based on responses recorded by an electromagnetic sensor array with images constructed based on responses recorded by an acoustic sensor array. For example, an image may be constructed depicting values of a first characteristic of the formation that was determined based on responses recorded by an electromagnetic sensor array and a second characteristic of the formation that was determined based on responses recorded by an acoustic sensor array with respect to azimuthal angle. Constructing the image may include, for each of a plurality of azimuthal angles other than the azimuthal angles associated with particular responses, interpolating between values of the first characteristic of the formation or the second characteristic of the formation at azimuthal angles associated with particular responses or extrapolating a value of the first characteristic of the formation or the second characteristic of the formation at one of the azimuthal angles associated with a particular response.

An image may be produced using multi-component induction image sensors by obtaining measurements representing responses recorded by one or more azimuthally distributed electromagnetic/acoustic sensor array(s), processing the measurements by, for example, calculating a weighted average of the measurements or calculating ratios between pairs of sensor responses, and generating two-dimensional images of the formation along the azimuthal and depth directions based on the processed measurements.

FIGS. 11A through 11C illustrate exemplary images produced using multi-component sensors. In this example, images constructed based on responses recorded by two different arrays of sensors (e.g., an array of acoustic sensors and an array of electromagnetic sensors), shown in FIGS. 11A and 11C, are fused to construct the image illustrated in FIG. 11B. More specifically, image 1110 in FIG. 11A illustrates an image in which measurements of the form $1/\sigma_{ZZ}$ for a first characteristic of a formation Z are represented by their relative brightness and are plotted against azimuth angle (in degrees) along the x-axis and depth (in inches) along the y-axis. Similarly, image 1130 in FIG. 11B illustrates an image in which measurements of the form $1/\sigma_{XX}$ for a second characteristic of a formation X are represented by their relative brightness and are plotted against azimuth angle (in degrees) along the x-axis and depth (in inches) along the y-axis. Image 1120 in FIG. 11B illustrates an image in which combined measurements of the form $(\sigma_{ZZ}/\sigma_{XX})^2$ for the two characteristics of the formation are represented by their relative brightness and are plotted against azimuth angle (in degrees) along the x-axis and depth (in inches) along the y-axis. Other methods for constructing images based on responses recorded by a single acoustic or electromagnetic sensor, a single array of acoustic or electromagnetic sensors, multiple arrays of a single sensor type, or multiple arrays of sensors of different types may be applied in various embodiments of the present disclosure.

The data collected by an azimuthally distributed sensor array may be used to optimize the drilling process. For example, drilling speed, type of mud and/or BHA configuration (e.g., stabilizer positions) may be optimized based on characteristics of the formation that are determined using the sensor data and stand-off parameters. The estimated electrical and/or acoustic parameters may be used to determine the dip parameters between two formation layers. These dip parameters may include the inclination angle and the strike angle. The inclination angle is the angle of the wellbore relative to a vertical line defined by the Earth's gravity vector at the point of measurement. The magnitude of the inclination from horizontal is often referred to as the dip. The strike angle represents the azimuth (e.g., relative to true North) of the intersection of a formation layer with a horizontal surface. The maximum dip is measured perpendicular to the strike angle.

Figure 12:
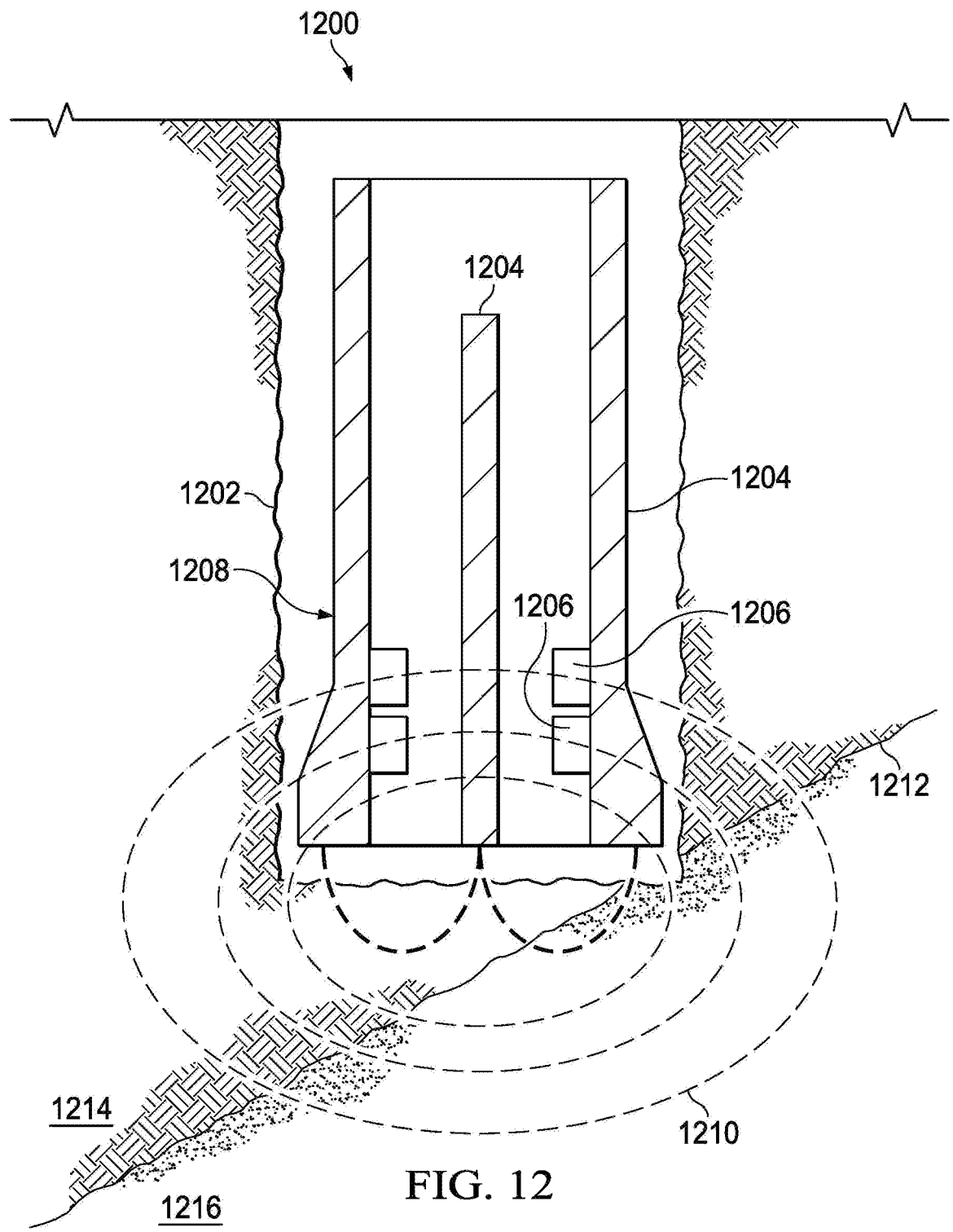
FIG. 12 is an elevation view of an exemplary drilling tool of a pulsed-power drilling system with an associated sensor analysis system.

FIG. 12 is an elevation view of an exemplary drilling tool of a downhole electrocrushing drilling and measurement system. In FIG. 12, the drilling tool 1208 is shown within wellbore 1202. The tip of the drilling tool is crossing the boundary surface 1212 between two formation layers 1214 and 1216 during a pulsed drilling operation. In this example, formation layer 1214 has resistivity R1 and dielectric permeability $\varepsilon 1$ and formation layer 1216 has resistivity R2 and dielectric permeability $\varepsilon 2$. Drilling tool 1208 includes electrodes 1204, including a center electrode and an electrode along the outer wall of the drilling tool.

During the pulsed drilling operation, a train of high-energy electrical pulses is applied between the electrodes 1204, producing high power discharges through the formation at the downhole end of the drill bit. The electrical arcs generated between the electrodes 1204 produce electromagnetic and acoustic waves 1210. Electromagnetic and acoustic sensors, shown as 1206, record responses to electromagnetic and acoustic waves 1210 produced by the pulsed drilling operation. Sensors 1206 may include one or more arrays of azimuthally distributed sensors. Measurements representing the responses recorded by the sensors 1206 may be processed to provide estimates of the dip parameters between formation layer 1214 and formation layer 1216. For example, the data recorded by these sensors may be processed to estimate the strength of the electric discharge along the corresponding angle, assuming that the sensors are placed close to the discharge region. Responses with varying magnitudes may be obtained from the sensors distributed along the azimuthal direction, as described above in reference to FIGS. 9A and 9B. The inclination angle and the strike angle may be computed based on the differences in the measurements of the strength of the electrical discharge obtained from respective ones of the sensors due to differences in the characteristics of the formation layers 1214 and 1216.

FIG. 13 is a block diagram illustrating an exemplary sensor analysis system 1300 associated with a pulsed-power drilling system. Sensor analysis system 1300 may be positioned at the surface for use with pulsed-power drilling system 100 as illustrated in FIG. 1, or at any other suitable location. Sensor analysis system 1300 may be configured to determine formation characteristics using electrical arc modeling. The sensor analysis system may use the results to determine dip parameters or to construct images depicting one or more characteristics of a formation with respect to azimuth angle, depth, or each other.

In the illustrated embodiment, sensor analysis system 1300 may include a processing unit 1310 coupled to one or more input/output interfaces 1320 and data storage 1318 over an interconnect 1316. Interconnect 1316 may be implemented using any suitable computing system interconnect mechanism or protocol. Processing unit 1310 may be configured to determine characteristics of a formation using electrical arc modeling, determine dip parameters, or construct images depicting one or more characteristics of a formation based, at least in part, on inputs received by input/output interfaces 1320. The inputs may include measurements representing responses recorded by various sensors, or arrays thereof, during pulsed drilling operations, such as voltages, currents, ratios of voltages to current, electric field strengths or magnetic field strengths. For example, processing unit 1310 may be configured to perform one or more inversions based on simulation models that relate the electromagnetic properties of the formation to electromagnetic data and/or relate the acoustic properties of the formation to acoustic data.

Processing unit 1310 may include processor 1312 that is any system, device, or apparatus configured to interpret and/or execute program instructions and/or process data associated with sensor analysis system 1300. Processor 1312 may be, without limitation, a microprocessor, microcontroller, digital signal processor (DSP), application specific integrated circuit (ASIC), or any other digital or analog circuitry configured to interpret and/or execute program instructions and/or process data. In some embodiments, processor 1312 may interpret and/or execute program instructions and/or process data stored in one or more computer-readable media 1314 included in processing unit 1310 to perform any of the methods described herein.

Computer-readable media 1314 may be communicatively coupled to processor 1312 and may include any system, device, or apparatus configured to retain program instructions and/or data for a period of time (e.g., computer-readable media). Computer-readable media 1314 may include random access memory (RAM), read-only memory (ROM), solid state memory, electrically erasable programmable read-only memory (EEPROM), disk-based memory, a PCMCIA card, flash memory, magnetic storage, opto-magnetic storage, or any suitable selection and/or array of volatile or non-volatile memory that retains data after power to processing unit 1310 is turned off. In accordance with some embodiments of the present disclosure, computer-readable media 1314 may include instructions for determining one or more characteristics of a formation 118, determining dip parameters or constructing images depicting one or more characteristics of a formation based on signals received from various sensors by input/output interfaces 1320.

As described above, input/output interfaces 1320 may be coupled to an optical fiber over which it may send and receive signals. Signals received by input/output interfaces 1320 may include measurements representing responses recorded by various sensors at the surface or downhole during a pulsed drilling operation. For example, signals received by input/output interfaces 1320 may include measurements representing responses recorded by acoustic, electrical or electromagnetic sensors. These measurements may include, without limitation, measurements of voltage, current, electric field strength, or magnetic field strength.

Data storage 1318 may provide and/or store data and instructions used by processor 1312 to perform any of the methods described herein for collecting and analyzing data from acoustic, electrical or electromagnetic sensors. In particular, data storage 1318 may store data that may be loaded into computer-readable media 1314 during operation of sensor analysis system 1300. Data storage 1318 may be implemented in any suitable manner, such as by functions, instructions, logic, or code, and may be stored in, for example, a relational database, file, application programming interface, library, shared library, record, data structure, service, software-as-service, or any other suitable mechanism. Data storage 1318 may store and/or specify any suitable parameters that may be used to perform the described methods. For example, data storage 1318 may provide information used to direct components of sensor analysis system 1300 to analyze measurements representing responses recorded by various acoustic, electrical or electromagnetic sensors during a pulsed drilling operation to determine one or more characteristics of a formation, such as formation 118 as shown in FIG. 1, to determine dip parameters or to construct images depicted one or more characteristics of a formation. Information stored in data storage 1418 may also include one or more models generated or accessed by processing unit 1410. For example, data storage 1418 may store a statistical model for electrical arc source or a model used in an inversion process, as described with respect to FIG. 5 and FIG. 6.

The elements shown in FIG. 13 are exemplary only and sensor analysis system 1300 may include fewer or additional elements in other embodiments. Modifications, additions, or omissions may be made to sensor analysis system 1300 without departing from the scope of the present disclosure. For example, sensor analysis system 1300 illustrates one particular configuration of components, but any suitable configuration of components may be used. Components of sensor analysis system 1300 may be implemented either as physical or logical components. Furthermore, in some embodiments, functionality associated with components of sensor analysis system 1300 may be implemented with special and/or general purpose circuits or components. Components of sensor analysis system 1300 may also be implemented by computer program instructions.

Embodiments herein may include:

A. A downhole drilling system including a drill bit including a first electrode and a second electrode, the first and second electrodes electrically coupled to a pulse-generating circuit to generate electrical arcs between the first and second electrodes based on pulse drilling signals received from the pulse-generating circuit during pulsed drilling operations in a wellbore, the electrical arcs occurring at random azimuthal locations between the first and second electrodes; a sensor to record responses to electromagnetic waves or acoustic waves produced by the electrical arcs; and a sensor analysis system communicatively coupled to the sensor, the sensor analysis system comprising a processor and a computer readable storage medium storing program instructions that when read and executed by the processor cause the processor to obtain a first plurality of measurements representing first responses recorded by the sensor during a pulsed drilling operation; generate a model of a source of the electrical arcs based on the first plurality of measurements; obtain an additional measurement representing a second response recorded by the sensor during the pulsed drilling operation; and determine a first characteristic of a formation in proximity to the drill bit using an inversion based on the model and on the additional measurement.

B. A method including performing a pulsed drilling operation in a wellbore using a drill bit including a first electrode and a second electrode electrically coupled to a pulse-generating circuit to generate electrical arcs between the first and second electrodes based on pulse drilling signals received from the pulse-generating circuit during pulsed drilling operations, the electrical arcs occurring at random azimuthal locations between the first and second electrodes and a sensor to record responses to electromagnetic waves or acoustic waves produced by the electrical arcs; obtaining a first plurality of measurements representing first responses recorded by the sensor during the pulsed drilling operation; generating a model of a source of the electrical arcs based on the first plurality of measurements; obtaining an additional measurement representing a second response recorded by the sensor during the pulsed drilling operation; and determining a first characteristic of a formation in proximity to the drill bit using an inversion based on the model and on the additional measurement.

C. A sensor analysis system including a processor and a computer readable storage medium storing program instructions that when read and executed by the processor cause the processor to receive a first plurality of measurements representing first responses to electromagnetic waves or acoustic waves recorded by a sensor during a pulsed drilling operation in a wellbore, the electromagnetic waves or acoustic waves produced by electrical arcs generated between first and second electrodes of a drill bit during the pulsed drilling operation based on pulse drilling signals; generate a model of a source of the electrical arcs based on the first plurality of measurements; obtain an additional measurement representing a second response recorded by the sensor during the pulsed drilling operation; and determine a first characteristic of a formation in proximity to the drill bit using an inversion based on the model and on the additional measurement.

Each of embodiments A, B and C may have one or more of the following additional elements in any combination: Element 1: wherein the sensor comprises at least one of an electromagnetic sensor, an acoustic sensor and an electrical sensor. Element 2: wherein determining the first characteristic of the formation in proximity to the drill bit comprises determining a characteristic of a bed boundary within the formation. Element 3: wherein determining the first characteristic of the formation in proximity to the drill bit comprises determining at least one of a dielectric constant, a resistivity, an impedance, a conductivity, a permeability, a density, a velocity, a Young's modulus and a magnetic susceptibility. Element 4: wherein generating a model of a source of the electrical arcs comprises generating a deterministic toroidal pulse source model by time-averaging data representing azimuthal locations and amplitudes of the electrical arcs. Element 5: wherein the inversion is based on a ratio between two measurements representing respective responses recorded by the sensor at different frequencies. Element 6: wherein the sensor is one of a plurality of sensors in a first array of azimuthally distributed sensors at a first axial position in a bottom-hole assembly of the downhole drilling system, each sensor in the first array records responses to electromagnetic waves or acoustic waves produced by the electrical arcs; the system comprises a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and the inversion is based on a ratio between a measurement representing a response recorded by a first sensor in the first array of sensors in a given azimuthal direction and a measurement representing a response recorded by a second sensor in the second array of sensors in the given azimuthal direction. Element 7: wherein the sensor is one of a plurality of sensors in a first array of azimuthally distributed sensors at a first axial position in a bottom-hole assembly of the downhole drilling system, each sensor in the first array records responses to electromagnetic waves or acoustic waves produced by the electrical arcs; the system comprises a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and the inversion is based on a difference between a measurement representing a response recorded by a first sensor in the first array of sensors in a given azimuthal direction and a measurement representing a response recorded by a second sensor in the second array of sensors in the given azimuthal direction. Element 8: wherein the sensor is one of a plurality of sensors in a first array of azimuthally distributed sensors at a first axial position in a bottom-hole assembly of the downhole drilling system, each sensor in the first array records responses to electromagnetic waves or acoustic waves produced by the electrical arcs; the system comprises a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and determining the first characteristic of the formation in proximity to the drill bit comprises fitting a measurement representing a response recorded by a first sensor in the first array of sensors in a given azimuthal direction and a measurement representing a response recorded by a second sensor in the second array of sensors in the given azimuthal direction to the model. Element 9: wherein generating a model of a source of the electrical arcs comprises: determining, for each of the first plurality of measurements, an azimuthal angle representing an excitation direction for one of the electrical arcs; and determining a respective number of measurements within the first plurality of measurements for which the determined azimuthal angle falls within each of a plurality of azimuthal angle ranges. Element 10: wherein generating a model of a source of the electrical arcs comprises generating a model of an effective source of the electrical arcs by calculating a weighted average of the measurements within the first plurality of measurements based on the respective number of measurements within the first plurality of measurements for which the determined azimuthal angle falls within each of the plurality of azimuthal angle ranges. Element 11: wherein the sensor is one of a plurality of sensors in a first array of azimuthally distributed sensors at a first axial position in a bottom-hole assembly of the downhole drilling system, each sensor in the first array records responses to electromagnetic waves or acoustic waves produced by the electrical arcs; and the sensor analysis system is further configured to estimate an azimuthal angle representing an excitation direction for one of the electrical arcs based on responses recorded by the plurality of sensors in the first array of sensors. Element 12: wherein the sensor is one of a plurality of antennas positioned at different azimuthal orientations in a bottom-hole assembly of the downhole drilling system, each sensor records responses to electromagnetic waves or acoustic waves produced by the electrical arcs; and the sensor analysis system is further configured to estimate an azimuthal angle representing an excitation direction based on responses recorded by the plurality of antennas. Element 13: wherein sensor analysis system is further configured to estimate an azimuthal angle representing an excitation direction by fitting a measurement representing a response to the electromagnetic waves or the acoustic waves produced by the electrical arcs recorded by the sensor to the model. Element 14: wherein determining the first characteristic of the formation comprises determining a respective value of a first characteristic of the formation at two azimuthal angles; and the sensor analysis system is further configured to determine a respective value of a second characteristic of the formation at the two azimuthal angles; and construct an image depicting values of the first characteristic of the formation and the second characteristic of the formation with respect to azimuthal angle. Element 15: wherein constructing the image comprises, for each of a plurality of azimuthal angles other than the two azimuthal angles, interpolating between values of the first characteristic of the formation or values of the second characteristic of the formation at the two azimuthal angles or extrapolating a value of the first characteristic of the formation or a value of the second characteristic of the formation at one of the two azimuthal angles. Element 16: wherein the first plurality of measurements and the additional measurement represent responses recorded by the sensor in the time domain. Element 17: wherein the first plurality of measurements and the additional measurement represent responses recorded by the sensor in the frequency domain. Element 18: wherein the sensor analysis system is further configured to determine at least one of an inclination angle at which the drill bit crosses a boundary between two layers within the formation and a strike angle at which the drill bit crosses a boundary between two layers within the formation. Element 19: wherein the sensor analysis system is further configured to initiate modification of an operating parameter of the pulsed drilling operation based on the first characteristic of the formation.

Although the present disclosure has been described with several embodiments, various changes and modifications may be suggested to one skilled in the art. It is intended that the present disclosure encompasses such various changes and modifications as falling within the scope of the appended claims.

What is claimed is:

1. A downhole drilling system, comprising:
    a drill bit including a first electrode and a second electrode, the first and second electrodes electrically coupled to a pulse-generating circuit to generate electrical arcs between the first and second electrodes based on pulse drilling signals received from the pulse-generating circuit during a pulsed drilling operation in a wellbore, the electrical arcs occurring at random azimuthal locations between the first and second electrodes;
    a sensor to record responses to electromagnetic waves or acoustic waves produced by the electrical arcs; and
    a sensor analysis system communicatively coupled to the sensor, the sensor analysis system comprising:
        a processor; and
        a computer readable storage medium storing program instructions that when read and executed by the processor cause the processor to:
            obtain a first plurality of measurements representing first responses recorded by the sensor during the pulsed drilling operation;
            generate a model of a source of the electrical arcs based on the first plurality of measurements;
            obtain an additional measurement representing a second response recorded by the sensor during the pulsed drilling operation;
            determine a first characteristic of a formation in proximity to the drill bit using an inversion based on the model and the additional measurement;
            determine a respective value of at least the first characteristic of the formation at least one azimuthal angle; and
            construct an image depicting values of at least the first characteristic of the formation with respect to the at least one azimuthal angle.

2. The system of claim 1, wherein the sensor comprises at least one of an electromagnetic sensor, an acoustic sensor and an electrical sensor.

3. The system of claim 1, wherein determining the first characteristic of the formation in proximity to the drill bit comprises determining a characteristic of a bed boundary within the formation.

4. The system of claim 1, wherein determining the first characteristic of the formation in proximity to the drill bit comprises determining at least one of a dielectric constant, a resistivity, an impedance, a conductivity, a permeability, a density, a velocity, a Young's modulus and a magnetic susceptibility.

5. The system of claim 1, wherein generating a model of a source of the electrical arcs comprises generating a deterministic toroidal pulse source model by time-averaging data representing azimuthal locations and amplitudes of the electrical arcs.

6. The system of claim 1, wherein the inversion is based on a ratio between two measurements representing respective responses recorded by the sensor at different frequencies.

7. The system of claim 1, wherein:
    the sensor is one of a plurality of sensors in a first array of azimuthally distributed sensors at a first axial position in a bottom-hole assembly of the downhole drilling system, each sensor in the first array records responses to the electromagnetic waves or the acoustic waves produced by the electrical arcs;
    the system comprises a second array of azimuthally distributed sensors at a second axial position in the bottom-hole assembly, each sensor in the second array records responses to the electromagnetic waves or the acoustic waves produced by the electrical arcs simultaneously with the plurality of sensors in the first array of sensors; and
    the inversion is based on a ratio between a measurement representing a response recorded by a first sensor in the first array of sensors in a given azimuthal direction and a measurement representing a response recorded by a second sensor in the second array of sensors in the given azimuthal direction.

8. The system of claim 1, wherein:
    the sensor is one of a plurality of sensors in a first array of azimuthally distributed sensors at a first axial position in a bottom-hole assembly of the downhole drilling system, each sensor in the first array records responses to electromagnetic waves or acoustic waves produced by the electrical arcs;
    the system comprises a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and
    the inversion is based on a difference between a measurement representing a response recorded by a first sensor in the first array of sensors in a given azimuthal direction and a measurement representing a response recorded by a second sensor in the second array of sensors in the given azimuthal direction.

9. The system of claim 1, wherein:
    the sensor is one of a plurality of sensors in a first array of azimuthally distributed sensors at a first axial position in a bottom-hole assembly of the downhole drilling system each sensor in the first array records responses to electromagnetic waves or acoustic waves produced by the electrical arcs;
    the system comprises a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and
    determining the first characteristic of the formation in proximity to the drill bit comprises fitting a measurement representing a response recorded by a first sensor in the first array of sensors in a given azimuthal direction and a measurement representing a response recorded by a second sensor in the second array of sensors in the given azimuthal direction to the model.

10. The system of claim 1, wherein generating a model of a source of the electrical arcs comprises:
determining, for each of the first plurality of measurements, an azimuthal angle representing an excitation direction for one of the electrical arcs; and
determining a respective number of measurements within the first plurality of measurements for which the determined azimuthal angle falls within each of a plurality of azimuthal angle ranges.

11. The system of claim 10, wherein generating a model of a source of the electrical arcs comprises generating a model of an effective source of the electrical arcs by calculating a weighted average of the measurements within the first plurality of measurements based on the respective number of measurements within the first plurality of measurements for which the determined azimuthal angle falls within each of the plurality of azimuthal angle ranges.

12. The system of claim 1, wherein:
the sensor is one of a plurality of sensors in a first array of azimuthally distributed sensors at a first axial position in a bottom-hole assembly of the downhole drilling system, each sensor in the first array records responses to electromagnetic waves or acoustic waves produced by the electrical arcs; and
the program instructions, when read and executed by the processor, further cause the processor to estimate an azimuthal angle representing an excitation direction based on responses recorded by the plurality of sensors in the first array of sensors.

13. The system of claim 1, wherein:
the sensor is one of a plurality of antennas positioned at different azimuthal orientations in a bottom-hole assembly of the downhole drilling system, each antenna records responses to electromagnetic waves or acoustic waves produced by the electrical arcs; and
the program instructions, when read and executed by the processor, further cause the processor to estimate an azimuthal angle representing an excitation direction based on responses recorded by the plurality of antennas.

14. The system of claim 1, wherein the program instructions, when read and executed by the processor, further cause the processor to estimate an azimuthal angle representing an excitation direction by fitting a measurement representing a response to the electromagnetic waves or the acoustic waves produced by the electrical arcs recorded by the sensor to the model.

15. The system of claim 1, wherein the respective value is a first respective value and the image is a first image, and wherein
the program instructions, when read and executed by the processor, further cause the processor to:
determine a second respective value of a second characteristic of the formation at the at least one azimuthal angle; and
construct a second image depicting the values of the first characteristic of the formation and values of the second characteristic of the formation with respect to the at least one azimuthal angle.

16. The system of claim 15, wherein constructing the image comprises:
for each of a plurality of azimuthal angles other than the at least one azimuthal angle, interpolating between values of the first characteristic of the formation or values of the second characteristic of the formation at the at least one azimuthal angle or extrapolating a value of the first characteristic of the formation or a value of the second characteristic of the formation at the at least one azimuthal angle.

17. The system of claim 1, wherein the first plurality of measurements and the additional measurement represent responses recorded by the sensor in the time domain.

18. The system of claim 1, wherein the first plurality of measurements and the additional measurement represent responses recorded by the sensor in the frequency domain.

19. The system of claim 1, wherein the program instructions, when read and executed by the processor, further cause the processor to determine at least one of an inclination angle at which the drill bit crosses a boundary between two layers within the formation and a strike angle at which the drill bit crosses the boundary between two layers within the formation.

20. The system of claim 1, wherein the program instructions, when read and executed by the processor, further cause the processor to initiate modification of an operating parameter of the pulsed drilling operation based on the first characteristic of the formation.

21. A method, comprising:
performing a pulsed drilling operation in a wellbore using:
a drill bit including a first electrode and a second electrode electrically coupled to a pulse-generating circuit to generate electrical arcs between the first and second electrodes based on pulse drilling signals received from the pulse-generating circuit during pulsed drilling operations, the electrical arcs occurring at random azimuthal locations between the first and second electrodes; and
a sensor to record responses to electromagnetic waves or acoustic waves produced by the electrical arcs;
obtaining a first plurality of measurements representing first responses recorded by the sensor during the pulsed drilling operation;
generating a model of a source of the electrical arcs based on the first plurality of measurements;
obtaining an additional measurement representing a second response recorded by the sensor during the pulsed drilling operation;
determining a first characteristic of a formation in proximity to the drill bit using an inversion based on the model and on the additional measurement;
determining a respective value of at least the first characteristic of the formation at at least one azimuthal angle; and
constructing an image depicting values of at least the first characteristic of the formation with respect to the at least one azimuthal angle.

22. The method of claim 21, wherein the sensor comprises at least one of an electromagnetic sensor, an acoustic sensor and an electrical sensor.

23. The method of claim 21, wherein determining the first characteristic of the formation in proximity to the drill bit comprises determining a characteristic of a bed boundary within the formation.

24. The method of claim 21, wherein determining the first characteristic of the formation in proximity to the drill bit comprises determining at least one of a dielectric constant, a resistivity, an impedance, a conductivity, a permeability, a density, a velocity, a Young's modulus and a magnetic susceptibility.

25. The method of claim 21, wherein generating a model of a source of the electrical arcs comprises generating a deterministic toroidal pulse source model by time-averaging data representing azimuthal locations and amplitudes of the electrical arcs.

26. The method of claim 21, wherein the inversion is based on a ratio between two measurements representing respective responses recorded by the sensor at different frequencies.

27. The method of claim 21, wherein:
the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs;
the method further comprises obtaining a second plurality of measurements representing responses recorded by a plurality of sensors in a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and
the inversion is based on a ratio between a measurement representing a response recorded by a first sensor in the first array of sensors in a given azimuthal direction and a measurement representing a response recorded by a second sensor in the second array of sensors in the given azimuthal direction.

28. The method of claim 21, wherein:
the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs;
the method further comprises obtaining a second plurality of measurements representing responses recorded by a plurality of sensors in a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and
the inversion is based on a difference between a measurement representing a response recorded by a first sensor in the first array of sensors in a given azimuthal direction and a measurement representing a response recorded by a second sensor in the second array of sensors in the given azimuthal direction.

29. The method of claim 21, wherein:
the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs;
the method further comprises obtaining a second plurality of measurements representing responses recorded by a plurality of sensors in a second array of azimuthally distributed sensors at a second axial position in the bottom-hole assembly, each sensor in the first array records responses to electromagnetic waves or acoustic waves produced by the electrical arcs simultaneously with the plurality of sensors in the first array of sensors; and
determining the first characteristic of the formation in proximity to the drill bit comprises fitting a measurement representing a response recorded by a first sensor in the first array of sensors in a given azimuthal direction and a measurement representing a response recorded by a second sensor in the second array of sensors in the given azimuthal direction to the model.

30. The method of claim 21, wherein generating a model of a source of the electrical arcs comprises:
determining, for each of the first plurality of measurements, an azimuthal angle representing an excitation direction for one of the electrical arcs; and
determining a respective number of measurements within the first plurality of measurements for which the determined azimuthal angle falls within each of a plurality of azimuthal angle ranges.

31. The method of claim 30, wherein generating a model of a source of the electrical arcs comprises generating a model of an effective source of the electrical arcs by calculating a weighted average of the measurements within the first plurality of measurements based on the respective number of measurements within the first plurality of measurements for which the determined azimuthal angle falls within each of the plurality of azimuthal angle ranges.

32. The method of claim 21, wherein:
the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs; and
the method further includes estimating an azimuthal angle representing an excitation direction based on responses recorded by the plurality of sensors in the first array of sensors.

33. The method of claim 21, wherein:
the sensor is one of a plurality of antennas positioned at different azimuthal orientations in a bottom-hole assembly positioned in the wellbore, each antenna records responses to electromagnetic waves or acoustic waves produced by the electrical arcs; and
the method further includes estimating an azimuthal angle representing an excitation direction based on responses recorded by the plurality of antennas.

34. The method of claim 21, further comprising estimating an azimuthal angle representing an excitation direction by fitting a measurement representing a response to the electromagnetic waves or the acoustic waves produced by the electrical arcs recorded by the sensor to the model.

35. The method of claim 21, wherein the respective value is a first respective value and the image is a first image, and wherein
the method further includes:
determining a second respective value of a second characteristic of the formation at the at least one azimuthal angle; and
constructing a second image depicting values of the first characteristic of the formation and values of the second characteristic of the formation with respect to the at least one azimuthal angle.

36. The method of claim 35, wherein constructing the image comprises:
for each of a plurality of azimuthal angles other than the at least one azimuthal angle, interpolating between values of the first characteristic of the formation or values of the second characteristic of the formation at the at least one azimuthal angle or extrapolating a value of the first characteristic of the formation or a value of the second characteristic of the formation at the at least one azimuthal angle.

37. The method of claim 21, further comprising determining at least one of an inclination angle at which the drill bit crosses a boundary between two layers within the formation and a strike angle at which the drill bit crosses the boundary between two layers within the formation.

38. The method of claim 21, further comprising modifying an operating parameter of the pulsed drilling operation based on the first characteristic of the formation.

39. A sensor analysis system, comprising:
a processor; and
a computer readable storage medium storing program instructions that when read and executed by the processor cause the processor to:
receive a first plurality of measurements representing first responses to electromagnetic waves or acoustic waves recorded by a sensor during a pulsed drilling operation in a wellbore, the electromagnetic waves or acoustic waves produced by electrical arcs generated between first and second electrodes of a drill bit during the pulsed drilling operation based on pulse drilling signals;
generate a model of a source of the electrical arcs based on the first plurality of measurements;
obtain an additional measurement representing a second response recorded by the sensor during the pulsed drilling operation;
determine a first characteristic of a formation in proximity to the drill bit using an inversion based on the model and on the additional measurement determine a respective value of at least the first characteristic of the formation at at least one azimuthal angle; and
construct an image depicting values of at least the first characteristic of the formation with respect to the at least one azimuthal angle.

40. The system of claim 39, wherein determining the first characteristic of the formation in proximity to the drill bit comprises determining a characteristic of a bed boundary within the formation.

41. The system of claim 39, wherein determining the first characteristic of the formation in proximity to the drill bit comprises determining at least one of a dielectric constant, a resistivity, an impedance, a conductivity, a permeability, a density, a velocity, a Young's modulus and a magnetic susceptibility.

42. The system of claim 39, wherein generating a model of a source of the electrical arcs comprises generating a deterministic toroidal pulse source model by time-averaging data representing azimuthal locations and amplitudes of the electrical arcs.

43. The system of claim 39, wherein the inversion is based on a ratio between two measurements representing respective responses recorded by the sensor at different frequencies.

44. The system of claim 39, wherein:
the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs;
the program instructions, when read and executed by the processor, further cause the processor to obtain a second plurality of measurements representing responses recorded by a plurality of sensors in a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and
the inversion is based on a ratio between a measurement representing a response recorded by a first sensor in the first array of sensors in a given azimuthal direction and a measurement representing a response recorded by a second sensor in the second array of sensors in the given azimuthal direction.

45. The system of claim 39, wherein:
the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs;
the program instructions, when read and executed by the processor, further cause the processor to obtain a second plurality of measurements representing responses recorded by a plurality of sensors in a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and
the inversion is based on a difference between a measurement representing a response recorded by a first sensor in the first array of sensors in a given azimuthal direction and a measurement representing a response recorded by a second sensor in the second array of sensors in the given azimuthal direction.

46. The system of claim 39, wherein:
the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs;
the program instructions, when read and executed by the processor, further cause the processor to obtain a second plurality of measurements representing responses recorded by a plurality of sensors in a second array of azimuthally distributed sensors at a second axial position in the bottom-hole assembly, each sensor in the second array records responses to electromagnetic waves or acoustic waves produced by the electrical arcs simultaneously with the plurality of sensors in the first array of sensors; and
determining the first characteristic of the formation in proximity to the drill bit comprises fitting a measurement representing a response recorded by a first sensor in the first array of sensors in a given azimuthal direction and a measurement representing a response recorded by a second sensor in the second array of sensors in the given azimuthal direction to the model.

47. The system of claim 39, wherein generating a model of a source of the electrical arcs comprises:

determining, for each of the first plurality of measurements, an azimuthal angle representing an excitation direction for one of the electrical arcs; and determining a respective number of measurements within the first plurality of measurements for which the determined azimuthal angle falls within each of a plurality of azimuthal angle ranges.

48. The system of claim 47, wherein generating a model of a source of the electrical arcs comprises generating a model of an effective source of the electrical arcs by calculating a weighted average of the measurements within the first plurality of measurements based on the respective number of measurements within the first plurality of measurements for which the determined azimuthal angle falls within each of the plurality of azimuthal angle ranges.

49. The system of claim 39, wherein:

the sensor is one of a plurality of sensors in a first array of azimuthally distributed sensors at a first axial position in a bottom-hole assembly positioned in the wellbore, each sensor in the first array records responses to electromagnetic waves or acoustic waves produced by the electrical arcs; and the program instructions, when read and executed by the processor, further cause the processor to estimate an azimuthal angle representing an excitation direction based on responses recorded by the plurality of sensors in the first array of sensors.

50. The system of claim 39, wherein:

the sensor is one of a plurality of antennas positioned at different azimuthal orientations in a bottom-hole assembly positioned in the wellbore, each antenna records responses to electromagnetic waves or acoustic waves produced by the electrical arcs; and the program instructions, when read and executed by the processor, further cause the processor to estimate an azimuthal angle representing an excitation direction based on responses recorded by the plurality of antennas.

51. The system of claim 39, wherein the program instructions, when read and executed by the processor, further cause the processor to estimate an azimuthal angle representing an excitation direction by fitting a measurement representing a response to the electromagnetic waves or the acoustic waves produced by the electrical arcs recorded by the sensor to the model.

52. The system of claim 39, wherein the respective value is a first respective value and the image is a first image, and wherein the program instructions, when read and executed by the processor, further cause the processor to:

determine a second respective value of a second characteristic of the formation at the at least one azimuthal angle; and construct a second image depicting values of the first characteristic of the formation and values of the second characteristic of the formation with respect to the at least one azimuthal angle.

53. The system of claim 52, wherein constructing the image comprises:

for each of a plurality of azimuthal angles other than the at least one azimuthal angle, interpolating between values of the first characteristic of the formation or values of the second characteristic of the formation at the at least one azimuthal angle or extrapolating a value of the first characteristic of the formation or a value of the second characteristic of the formation at one of the at least one azimuthal angle.

54. The system of claim 39, wherein the program instructions, when read and executed by the processor, further cause the processor to determine at least one of an inclination angle at which the drill bit crosses a boundary between two layers within the formation and a strike angle at which the drill bit crosses the boundary between two layers within the formation.

55. The system of claim 39, wherein the program instructions, when read and executed by the processor, further cause the processor to initiate modification of an operating parameter of the pulsed drilling operation based on the first characteristic of the formation.

* * * * *